(12) United States Patent
Song et al.

(10) Patent No.: US 10,845,220 B2
(45) Date of Patent: Nov. 24, 2020

(54) METHOD OF SENSING ROTATION OF ROTATION MEMBER AND ELECTRONIC DEVICE PERFORMING SAME

(71) Applicant: Samsung Electronics Co., Ltd., Gyeonggi-do (KR)

(72) Inventors: Younghoon Song, Gyeonggi-do (KR); Min-Su Han, Gyeonggi-do (KR); Geon-Soo Kim, Gyeonggi-do (KR); Doo-Suk Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 15/201,892

(22) Filed: Jul. 5, 2016

(65) Prior Publication Data
US 2017/0016748 A1 Jan. 19, 2017

(30) Foreign Application Priority Data

Jul. 15, 2015 (KR) .................. 10-2015-0100670

(51) Int. Cl.
  *G01D 5/58* (2006.01)
  *G06F 3/0362* (2013.01)
  *G06F 1/16* (2006.01)

(52) U.S. Cl.
  CPC .............. *G01D 5/58* (2013.01); *G06F 1/163* (2013.01); *G06F 3/0362* (2013.01)

(58) Field of Classification Search
  CPC ........... G01D 5/56; G01D 5/58; G06F 3/0362
  See application file for complete search history.

(56) References Cited

U.S. PATENT DOCUMENTS 6,138,063 A * 10/2000 Himeda ............... G05D 1/0223
                                                         29/273
7,375,681 B1    5/2008 Woo
(Continued)

FOREIGN PATENT DOCUMENTS

CN         103210580 A     7/2013
CN         104698831 A     6/2015
(Continued)

OTHER PUBLICATIONS

Dynapar, "Dynapar Magnetic Encoder Overview" Aug. 1, 2012. [retrieved on Dec. 23, 2018]. Retrieved from the Internet <URL: https://web.archive.org/web/20120801003543/https://www.dynapar.com/technology/encoder_basics/magnetic_encoder/> (Year: 2012).*

(Continued)

*Primary Examiner* — Alexander Satanovsky
*Assistant Examiner* — Liam R Casey
(74) *Attorney, Agent, or Firm* — Cha & Reiter, LLC

(57) ABSTRACT

The present disclosure relates to a method of sensing rotation of a rotation member and an electronic device performing the method, wherein the electronic device may include: a housing including one side having a substantially circular opening; a substantially circular structure configured to be rotatably positioned in or around the opening of the housing; a first sensor configured to detect a first rotation of the structure to generate a first signal; a second sensor configured to detect a second rotation of the structure, to generate a second signal; a processor coupled to the first sensor and the second sensor; and a memory coupled to the processor, wherein the memory includes instructions to enable the processor, on execution, to detect the rotation of the structure based on at least a part of the first signal or a part of the second signal, to correct the first signal to reflect actual (Continued)

rotation of the structure, and to perform a predetermined action based on at least part of the corrected first signal.

14 Claims, 27 Drawing Sheets

(56) References Cited

U.S. PATENT DOCUMENTS

| | | | |
|---|---|---|---|
| 2003/0070106 A1 | 4/2003 | Kosuda et al. | |
| 2003/0079358 A1* | 5/2003 | Nai | G01B 21/045 33/503 |
| 2012/0325040 A1* | 12/2012 | Yamamoto | B25J 9/103 74/490.03 |
| 2013/0132026 A1* | 5/2013 | Lippuner | G01B 21/045 702/151 |
| 2013/0308117 A1* | 11/2013 | Bridges | G01N 21/93 356/3.09 |
| 2014/0253105 A1 | 9/2014 | Wiszniewski et al. | |
| 2014/0267879 A1* | 9/2014 | Loukusa | G03B 17/18 348/345 |
| 2014/0333536 A1 | 11/2014 | Tee et al. | |
| 2015/0130448 A1* | 5/2015 | Im | G01D 5/24433 324/207.25 |
| 2015/0316428 A1* | 11/2015 | Urata | F16H 57/01 310/68 B |
| 2016/0250929 A1* | 9/2016 | Nakano | B60L 3/102 701/22 |
| 2016/0327915 A1* | 11/2016 | Katzer | G04B 19/04 |
| 2017/0138419 A1* | 5/2017 | Neuberth | F16D 48/06 |

FOREIGN PATENT DOCUMENTS

| | | | | |
|---|---|---|---|---|
| CN | 104713515 A | 6/2015 | | |
| CN | 104767844 A | 7/2015 | | |
| EP | 2136061 A1 * | 12/2009 | ......... | F02D 41/0097 |
| JP | 2004-184396 A | 7/2004 | | |
| WO | 2014/098008 A1 | 6/2014 | | |

OTHER PUBLICATIONS

European Search Report, dated Nov. 22, 2016.
European Search Report dated Jul. 24, 2018.
Chinese Search Report dated Sep. 1, 2020.

* cited by examiner

| Time stamp (period) | Event(Distance, detent) |
|---|---|
| 1P(11ms) | (2,0) |
| 2P(22ms) | (3,0) |
| 3P(33ms) | (6,0) |
| 4P(44ms) | (3,0) |
| 5P(55ms) | No event (Determine detent) |
| 6P(66ms) | (3,1)(Generate event notification) |

METHOD OF SENSING ROTATION OF ROTATION MEMBER AND ELECTRONIC DEVICE PERFORMING SAME

CLAIM OF PRIORITY

This application claims the priority under 35 U.S.C. § 119(a) to Korean Application Serial No. 10-2015-0100670, which was filed in the Korean Intellectual Property Office on Jul. 15, 2015, the entire content of which is hereby incorporated by reference.

TECHNICAL FIELD

Various exemplary embodiments of the present disclosure relate to an apparatus and a method for sensing rotation of a rotation member provided in an electronic device.

BACKGROUND

Electronic devices are gradually improving to become compact, slim, and easy to carry while having the same or various functions. Users generally carry compact electronic devices in the pocket but may put these devices on the wrist, the head portion, or the arm. Due to the small size of these devices, novel inputting methods that allow users to interact with these devices are required.

SUMMARY

A wearable device to be put on a body part or various structures is comparatively compact and slim, and may thus employ a rotation member, such as a wheel key and a rotary bezel, as an input device. For example, an electronic device may sense an optical pattern of a rotation member using an optical sensor including a light receiver and a light emitter, thereby sensing rotation of the rotation member.

In addition, the electronic device may include a plurality of detents to provide a sense of rotation boundary of the rotation member to the user or to provide tactile feedback to the user while he or she is rotating the rotation member. However, the electronic device may sense rotation of the rotation member but may have an error in sensing a rotation input due to the rotation speed of the rotation member.

Various exemplary embodiments of the present disclosure may provide an apparatus and a method for correcting a rotation input error with respect to the rotation member in the electronic device.

An electronic device according to various exemplary embodiments may include: a housing including one side having a substantially circular opening; a substantially circular structure configured to be rotatably positioned in or around the opening of the housing; a first sensor configured to detect a first rotation of the structure to generate a first signal; a second sensor configured to detect a second rotation of the structure, to generate a second signal; a processor coupled to the first sensor and the second sensor; and a memory coupled to the processor, wherein the memory includes instructions to enable the processor, on execution, to detect the rotation of the structure based on at least a part of the first signal or a part of the second signal, to correct the first signal to reflect actual rotation of the structure, and to perform a predetermined action based on at least part of the corrected first signal.

A rotation sensing method of an electronic device according to various exemplary embodiments may include generating a first signal by detecting a rotation of a rotation member including a portion of a main body of the electronic device; detecting the rotation of the rotation member based on at least a part of the first signal; correcting the first signal to reflect actual rotation of the rotation member when the rotation of the rotation member corresponding to the first signal is different from an actual rotation of the rotation member; and performing a predetermined action based on at least part of the corrected first signal.

A computer-readable recording medium according to various exemplary embodiments may record a program to implement an operation of generating a first signal by detecting a rotation of a rotation member including a portion of a main body of the electronic device; detecting the rotation of the rotation member based on at least a part of the first signal; correcting the first signal to reflect actual rotation of the rotation member when the rotation of the rotation member corresponding to the first signal is different from an actual rotation of the rotation member; and performing a predetermined action based on at least part of the corrected first signal.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
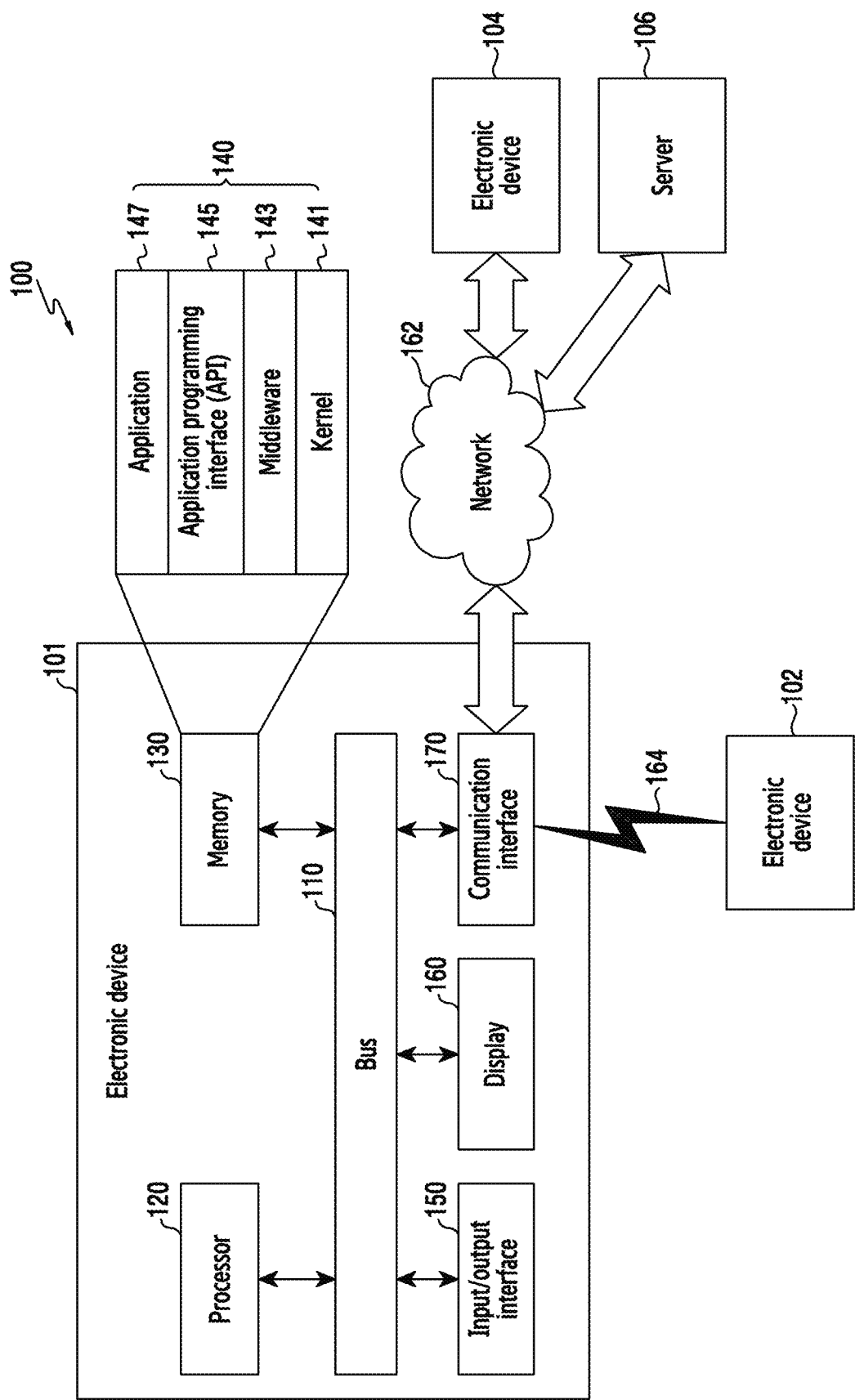
FIG. 1 is a view illustrating an electronic device in a network environment according to various exemplary embodiments.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor(AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multi-media player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync™, Apple TV™, or Google TV™); a game console (e.g., Xbox™, PlayStation™); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like).

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter).

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a view illustrating a network environment 100 including an electronic device 101 according to various embodiments. Referring to FIG. 1, the electronic device 101 may include a bus 110, a processor 120, a memory 130, an input/output (I/O) interface 150, a display 160, and a communication interface 170.

The bus 110 may be a circuit for connecting the above-described elements (e.g., the processor 120, the memory 130, the I/O interface 150, the display 160 or the communication interface 170, etc.) with each other, and transferring communication (e.g., a control message) between the above-described elements.

The processor 120 may include a central processing unit (CPU), a communication processor (CP), a graphic processing unit (GPU).

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction, for example executing an application or processes related to an operating system.

The memory 130 may include any suitable type of volatile or non-volatile memory. For example, the memory 130 may be a hard drive, flash storage, or RAM. The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

The communication interface 170 may connect communication between the electronic device 101 and an external device (for example, the electronic device 104 or the server 106). For example, the communication interface 170 may be connected to a network 162 through wireless communication or wired communication, and may communicate with an external device 102 via a wireless connection 164.

The wireless communication may use at least one of, for example, Long Term Evolution (LTE), LTE-Advance (LTE- A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed in the electronic device 101 may be carried out in another electronic device or a plurality of electronic devices (for example, the electronic device 102 or 104 and the server 106). According to an embodiment, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 2:
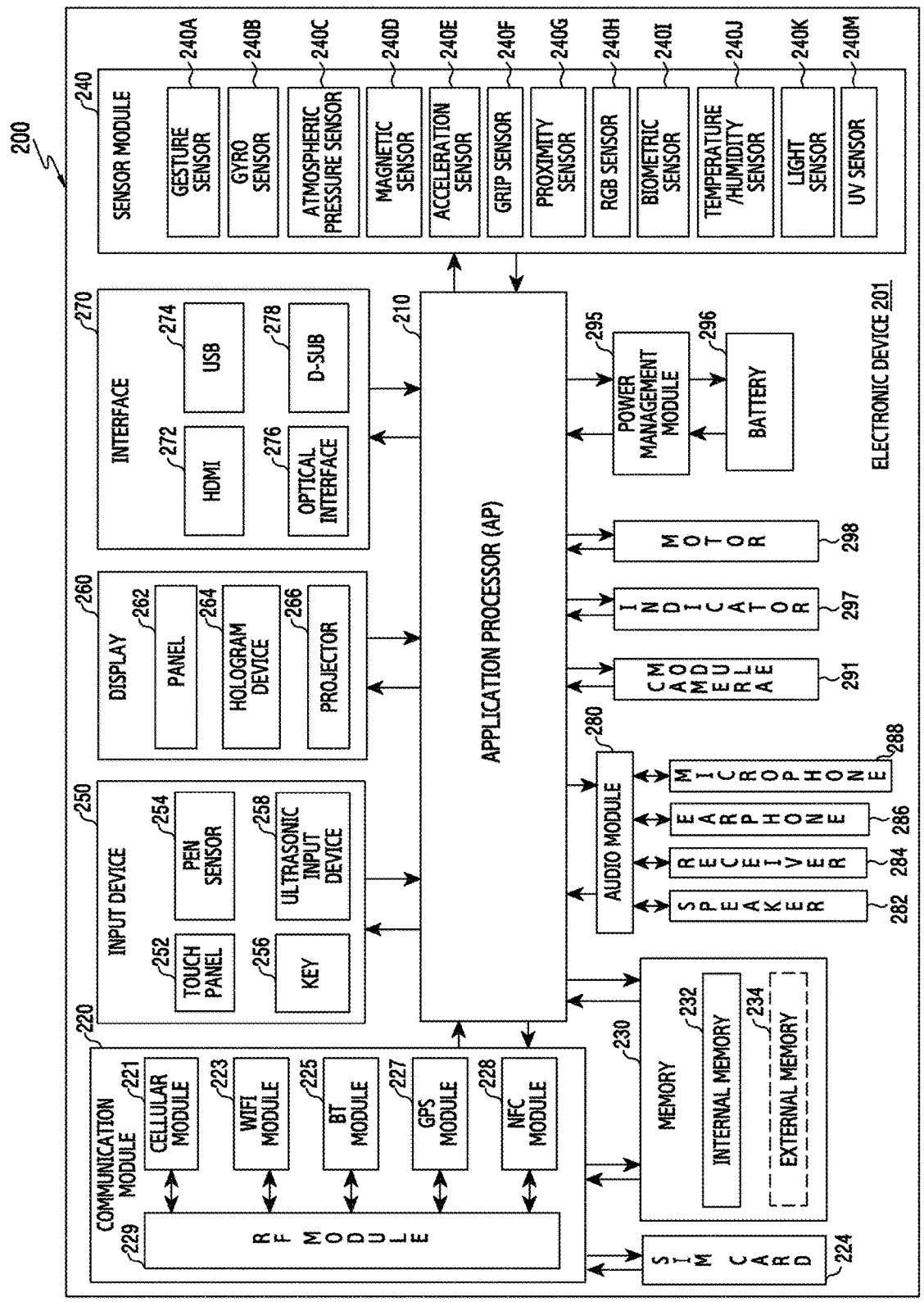
FIG. 2 is a block diagram of an electronic device according to various exemplary embodiments.

FIG. 2 is a block diagram 200 illustrating an electronic device 201 according to various embodiments of the present invention. The electronic device 201 may configure, for example, all or a portion of the electronic device 21 illustrated in FIG. 1. Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include at least one of a graphic processing unit (GPU) or image signal processor, or another co-processor. According to an embodiment, the AP 210 may be implemented to include at least a portion (e.g., the cellular module 221) of the above-described elements. Also, the AP 210 may stores data received from at least one of other elements or generated by at least one of other elements in a non-volatile memory.

The communication module 220 (e.g., the communication interface 160) may perform data transmission/reception in communication between the electronic device 201 (e.g., the electronic device 21) and other electronic devices (e.g., the electronic device 24 or the server 26) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identify module (e.g., a SIM card 224). According to an embodiment, the cellular module 221 may perform at least a portion of functions that may be provided by the AP 210. According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 20) may include a built-in memory 232 or an external memory 234 and may be volatile or non-volatile memory. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive, solid state drive, or flash storage.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 160) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. For example, the motor 298 may provide mechanical feedback to the user, such as when the user taps on the display. Though not shown, the electronic device 201 may include a processor (e.g., a GPU) for supporting a mobile TV. The processor for supporting the mobile TV may process media data corresponding to standards, for example, such as digital multi-media broadcasting (DMB), digital video broadcasting (DVB), or a media flow, etc.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
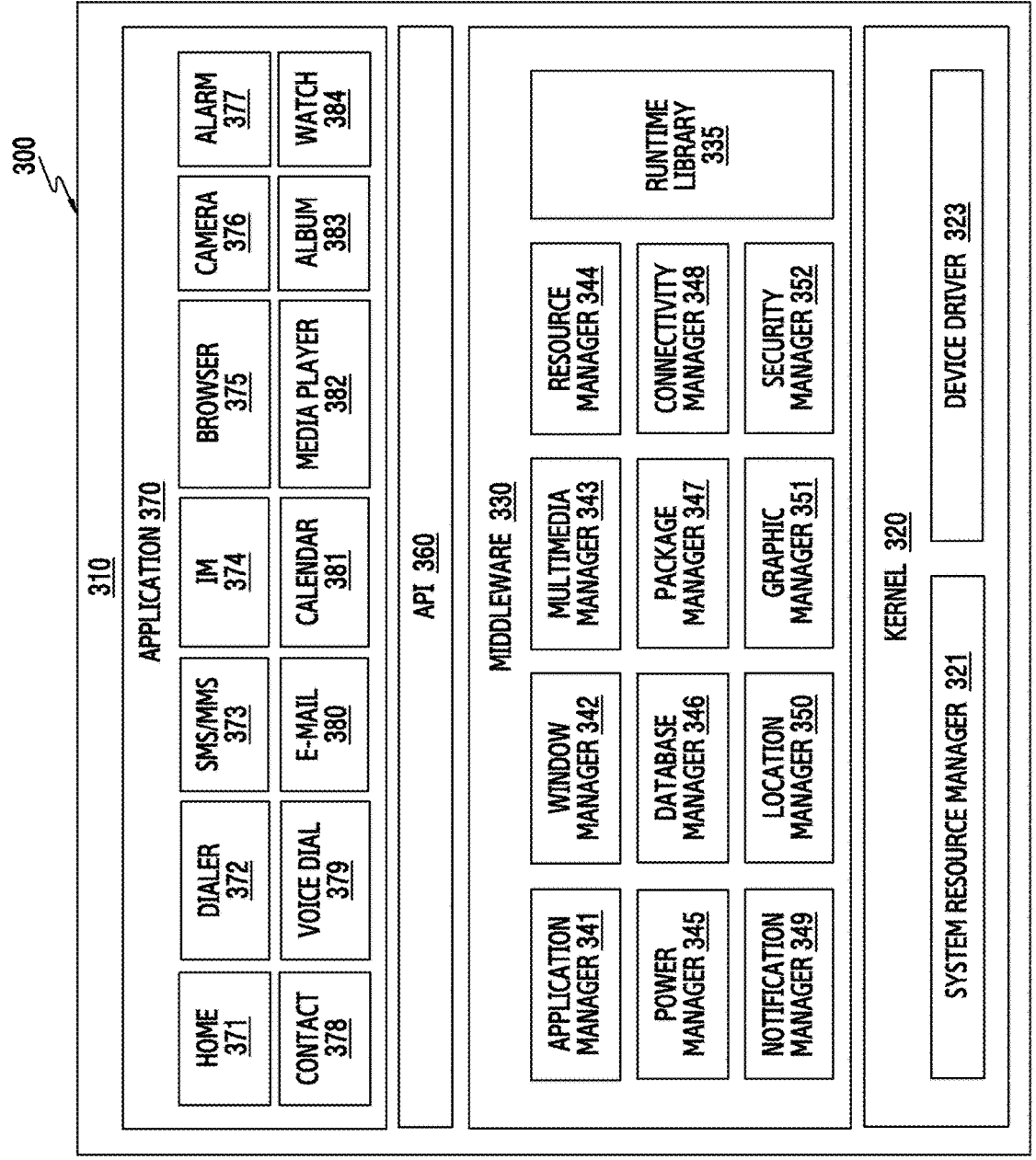
FIG. 3 is a block diagram of a program module according to various exemplary embodiments.

FIG. 3 is a block diagram 300 of a program module 310 according to various embodiments of the present invention.

According to an embodiment, the program module 310 (for example, the programs 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 321 or a device driver 323. The system resource manager 321 may control, allocate, or collect the system resources. According to an embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 101) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 101) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 101 (for example, an SMS/

MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a pre-loaded application or a third party application which can be downloaded from the server. The names of the components of the program module 310 according to the embodiment illustrated in FIG. 3 may vary according to the type of operating system.

According to various embodiments, at least some of the programming module 310 may be implemented by software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

A terminology "module" used for the present disclosure may mean, for example, a unit including a combination of one or two or more among a hardware, a software, or a firmware. A "module" may be interchangeably used with a terminology such as a unit, a logic, a logical block, a component, or a circuit, etc. A "module" may be a minimum unit of an integrally configured part or a portion thereof. A "module" may be a minimum unit performing one or more functions or a portion thereof. A "module" may be mechanically or electronically implemented. For example, a "module" according to the present disclosure may include at least one of an application-specific integrated circuit (ASIC) chip, a field-programmable gate arrays (FPGAs), or a programmable-logic device which are known, or to be developed in the future, and performing certain operations.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se. A control unit or module may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

According to various embodiments, at least a portion of an apparatus (e.g., modules or functions thereof) or a method (e.g., operations) according to the present disclosure may be implemented as an instruction stored in a computer-readable storage media, for example, in the form of a programming module. An instruction, when executed by one or more processors (e.g., the processor 120), may allow the one or more processors to perform a function corresponding to the instruction. The computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The computer-readable storage media may include a hard disk, a magnetic media such as a floppy disk and a magnetic tape, Compact Disc Read Only Memory (CD-ROM), optical media such as Digital Versatile Disc (DVD), magneto-optical media such as a floptical disk, and a hardware device specially configured for storing and performing a program instruction (e.g., a programming module) such as Read Only Memory (ROM), Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

Figure 4A:
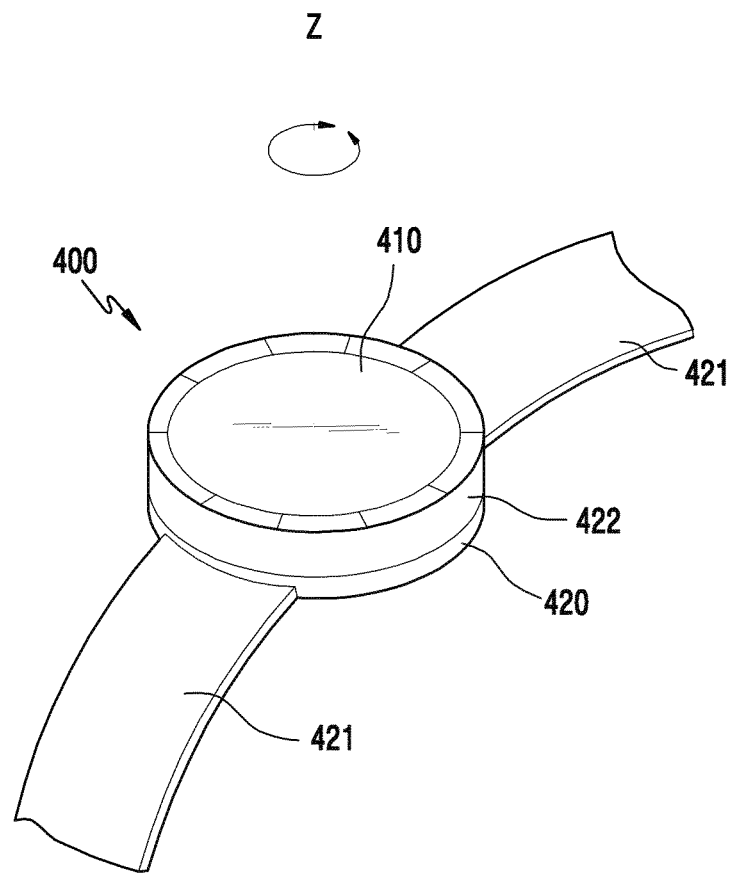
FIG. 4A and FIG. 4B are views illustrating an electronic device according to one exemplary embodiment of the present disclosure.
Figure 4B:
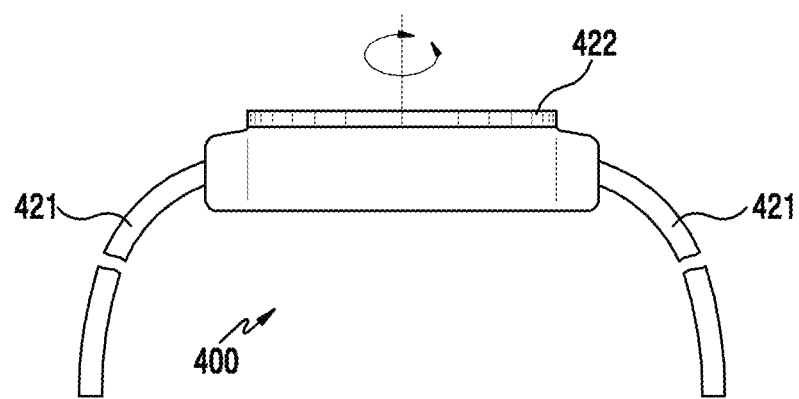

FIGS. 4A and 4B are views illustrating an electronic device according to various exemplary embodiments.

FIG. 4A illustrates a perspective view of the electronic device according to various exemplary embodiments of the present disclosure.

Referring to FIG. 4A, the electronic device 400 (for example, the electronic device 101 of FIG. 1) is a wrist-wearable electronic device to be worn on the user's wrist.

According to one exemplary embodiment, the electronic device 400 may include a main body 420 and a connector 421 (for example, a watch strap) connected to the main body 420. According to various exemplary embodiments, the electronic device 400 may include a battery (for example, a rechargeable battery and the like) therein as a power supply. The electronic device 400 may be configured to be mounted on a portable recharging cradle to recharge the battery.

According to one exemplary embodiment, the main body 420 may include a display 410 and/or at least one key button (not shown). The display 410 may include a touch screen to receive a touch input. According to one exemplary embodiment, the main body 420 has a substantially cylindrical shape with a substantially circular face having an opening, and a rotation member 422 (for example, a rotary input module) that is capable of adjusting various user interface environments displayed on the display 410 may be mounted on the opening of the main body 420. Alternatively, the rotation member 422 may be installed to be rotatable on a lower side, an upper side, or a lateral side of the main body 420. For example, the rotation member 422 may be disposed on a bezel that surrounds the edge of the display 410 disposed on the upper side of the main body 420. Or the rotation member 422 may be installed to be rotatable on the connector 421. According to one exemplary embodiments the rotation member 422 may be rotated clockwise or counterclockwise on the z-axis as a rotation axis and be configured to be rotated in a predetermined range up to a limited maximum degree of rotation (for example, up to 360 degrees) or to be rotated infinitely. According to one exemplary embodiment, the rotation member 422 may be disposed in a protruding shape, such as a crown, on the lateral side of the main body 420 to be rotated.

According to one exemplary embodiment, when a user rotates the rotation member 422, the electronic device 400 may perform various functions according to a rotation parameter of the rotation member 422. For example, the electronic device 400 may detect the rotation parameter of the rotation member 422 using at least one rotation sensing unit. For example, a plurality of rotation sensing units may include an optical sensor that senses an optical pattern of the rotation member 422. Alternatively, the plurality of rotation sensing units may include a sensor (for example, a proximity sensor, a magnetic sensor, and the like) to determine a rotation of the rotation member 422. According to one exemplary embodiment, the rotation parameter may include at least one of a rotation direction, rotation speed, the degree of rotation, and a rotated position of the rotation member 422.

FIG. 4B illustrates a lateral view of the electronic device according to one exemplary embodiment. Referring to FIG. 4B, the electronic device 400 may be worn by placing the main body 420 on the wrist and winding the wrist with the connector 421. The connector 421 may include a plurality of wrist strap adjustment holes (not shown) positioned at regular intervals to adjust a wearing position to fit the user's wrist. According to one exemplary embodiment, the connector 421 may be formed of at least one material of metal, leather, rubber, silicone, and urethane. According to one exemplary embodiment, the connector 421 may be worn on a specific body part, for example, the neck, wrist, ankle, and the like.

FIGS. 5A to 5D are cross-sectional views illustrating a mechanical structure that provides a sense of rotation boundary of a rotation member according to one exemplary embodiment of the present disclosure.

Figure 5A:
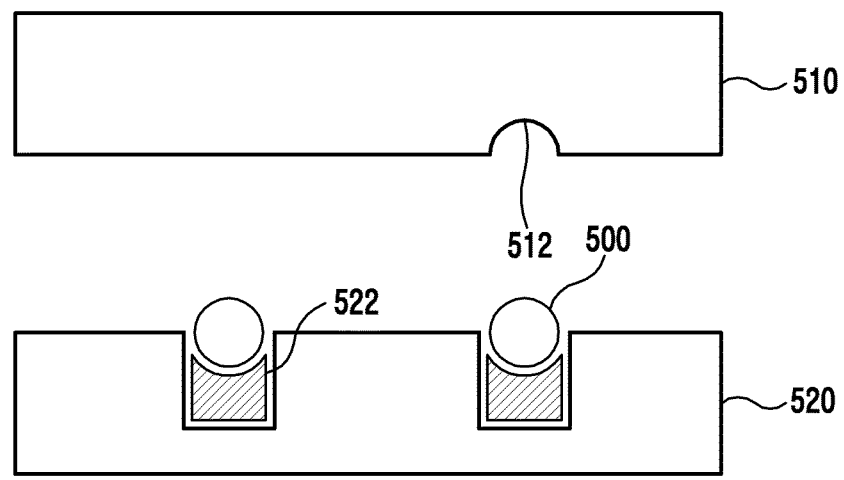
FIG. 5A, FIG. 5B, FIG. 5C and FIG. 5D are cross-sectional views illustrating a mechanical structure that provides a sense of rotation boundary of a rotation member according to one exemplary embodiment of the present disclosure.
Figure 5B:
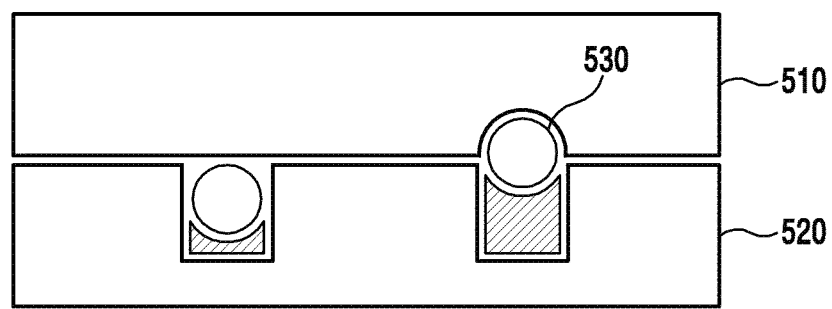
Figure 5C:
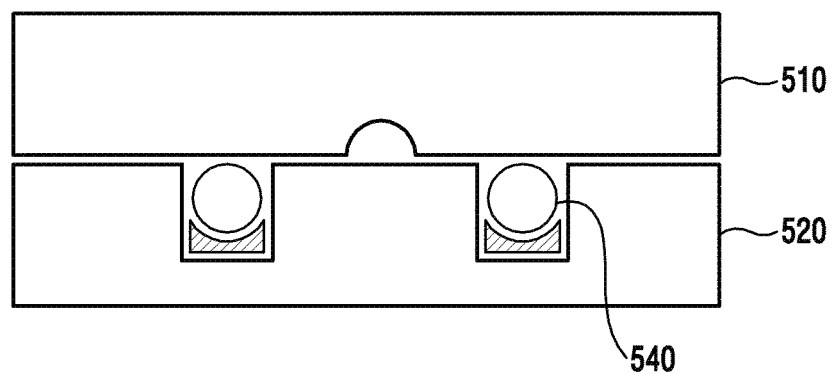

In FIG. 5A, at least one groove (or space) may be formed on an upper surface of a main body 520 (which may correspond to main body 420 in FIG. 4A) to fit a detent (or protrusion) thereto, and an elastic member 522 may be disposed in each groove to support the detent 500. According to various exemplary embodiments, at least one groove 512 into which part of each detent 500 is inserted may be formed on a rear surface of a rotation member 510 (which may correspond to rotation member 422 in FIG. 4A). According to one exemplary embodiment, the detents 500 may protrude in a ball shape and be formed at intervals. According to various exemplary embodiments, when the detent 500 is fit to, or detached from, the groove 512 of the rotation member 510, a sense of rotation boundary of the rotation member 510 (for example, a sound made when the detent 500 is fit to or detached from the groove 512) may be provided as tactile feedback to the user. According to a rotary movement of the rotation member 510, the detent 500 may move up and down in each groove formed on the main body 520. For example, as illustrated in FIG. 5B, when the groove 512 formed on the rear surface of the rotation body 510 is in a corresponding position to the groove formed on the main body 520, the detent 500 may move upwards 530 by the elastic member 522. As illustrated in FIG. 5C, when the groove 512 formed on the rear surface of the rotation body 510 is out of the corresponding position to the groove formed on the main body 520, the detent 500 may move downwards 540 by the elastic member 522.

Figure 5D:
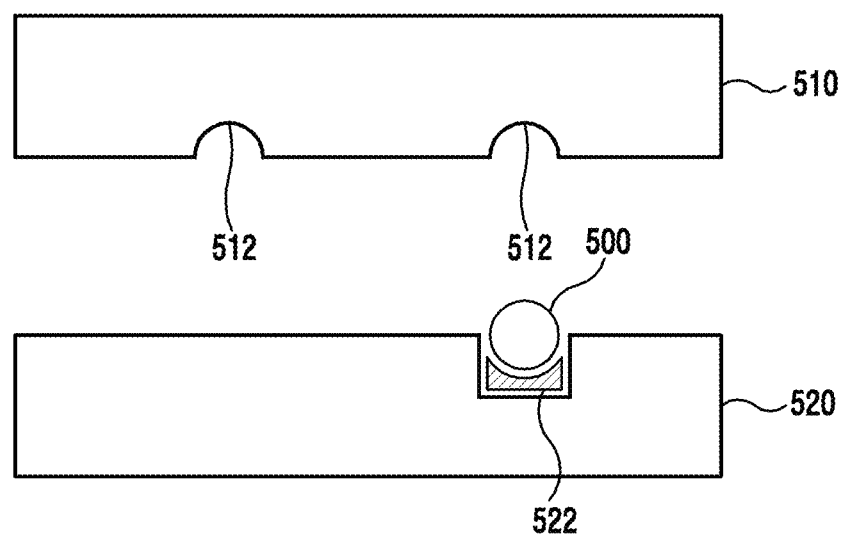

According to one exemplary embodiment, as illustrated in FIG. 5D, one groove (or space) may be formed on the upper surface of the main body 520 to fit a detent (or protrusion) thereto, and an elastic member 522 may be disposed in the groove to support the detent 500. In this case, the main body 520 may include only one detent 500, as opposed to a plurality of detents shown in FIG. 5A. Alternatively, the main body 520 and the rear surface of the rotation member 510 may be fitted with one or more magnetic members instead of the grooves and detents to provide similar feedback to the user.

According to one exemplary embodiment, at least one groove 512 into which part of each detent 500 is inserted may be formed on the rear surface of the rotation member 510. According to another exemplary embodiment, a plurality of grooves 512 formed on the rotation body 510 may be formed at intervals, and the detent 500 positioned on the upper surface of the main body 520 may be fit or detach by rotation.

Figure 6:
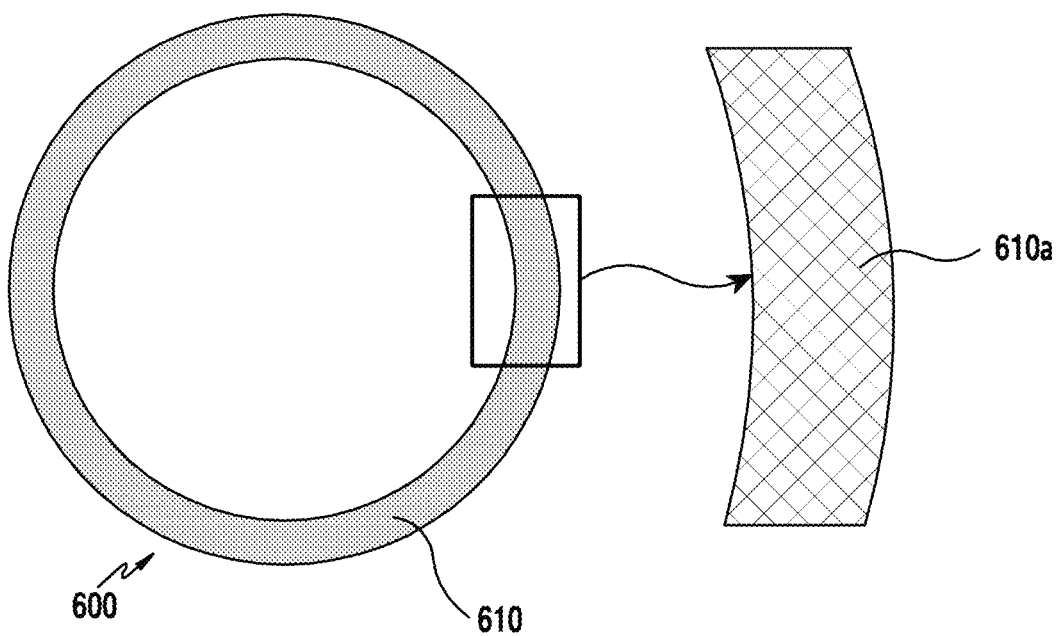
FIG. 6 illustrates an optical pattern formed on a lower surface of a rotation member according to one exemplary embodiment of the present disclosure.

FIG. 6 illustrates an optical pattern formed on a rotation member according to one exemplary embodiment of the present disclosure.

Referring to FIG. 6, the rotation member 600 according to one exemplary embodiments may be, for example, the rotation member 422 of FIG. 4A. According to one exemplary embodiment, the optical pattern may be engraved on at least a portion of the rotation member 600. For example, the optical pattern 610a may be engraved on a lower surface 610 of the rotation member 600. The optical pattern 610a may be engraved on the entire lower surface of the rotation member 600 in a uniform pattern. The optical pattern 610a may be engraved using a laser. The optical pattern 610a may be used to detect the degree of rotation or a rotation direction of the rotation body 600, which will be described further in detail below.

Figure 7:
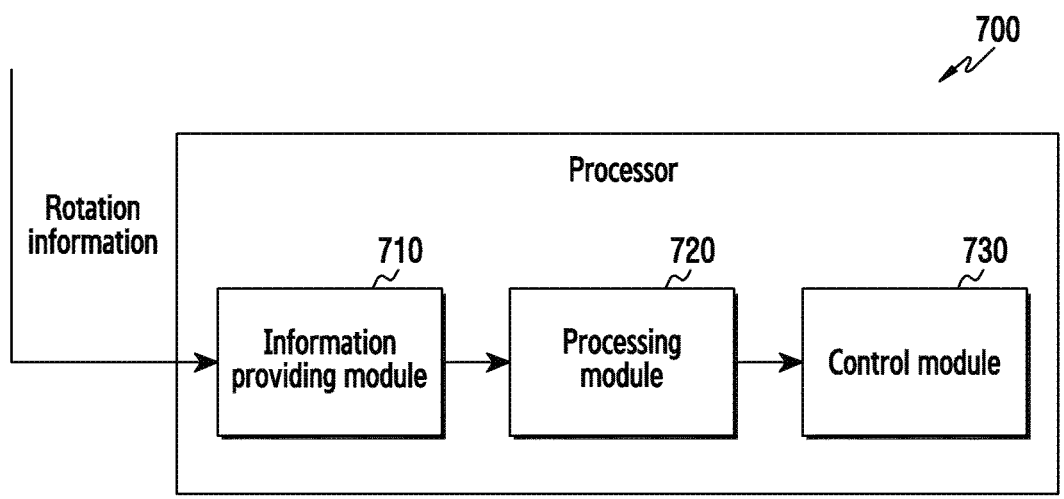
FIG. 7 is a block diagram of a processor according to one exemplary embodiment of the present disclosure.

FIG. 7 is a block diagram illustrating a configuration of a processor 700 according to one exemplary embodiment of the present disclosure. According to one exemplary embodiment, the processor 700 may be a processor 120 of the electronic device 101.

According to one exemplary embodiment, the processor 700 may include an information providing module 710, a processing module 720, and a control module 730.

The information providing module 710 may acquire rotation information on a rotation member (for example, the rotation member 422) and may provide the rotation information for the processing module 720. According to one exemplary embodiment, the rotation information may be a signal output from an optical sensor that senses an optical pattern (for example, 610a) of the rotation member 422. The outputted signal may be raw data. According to one exemplary embodiment, the information providing module 710 may collect the rotation information from the optical sensor at an interval of a predetermined time (for example, 11 ms) and may provide the rotation information for the processing module 720. The information providing module 710 may acquire the rotation information using various sensors, such as a proximity sensor, a magnetic sensor, and the like.

The processing module 720 may generate an event notification to the control module 730 based on the rotation information provided from the information providing module 710. According to one exemplary embodiment, the event notification may be information to indicate that the rotation member 422 reaches a designated position to perform a designated function, or that the rotation member 422 is rotated via a designated position. According to another exemplary embodiment, the event notification may be a command to instruct that a predetermined function be performed corresponding to rotation of the rotation member 422 in a predetermined state.

According to one exemplary embodiment, the processing module 720 may generate the event notification when a predetermined threshold number is exceeded by the pieces of rotation information provided from the information providing module 710. The processing module 720 may compare the pieces of rotation information accumulated until the rotation member 422 stops rotating with the threshold number.

According to one exemplary embodiment, the processing module 720 may determine a time to generate the event notification based on the number of functions to be performed by rotation of the rotation member 422. For example, when there are 12 functions to be performed by rotation of the rotation member 422, which may rotate 360 degrees, the processing module 720 may determine to generate the even notification whenever the rotation member 422 is rotated by 30 degrees. The processing module 720 may generate the event notification to perform a first function when the rotation member 422 is rotated by 30 degrees from 0 degrees and is stopped. The processing module 720 may generate the event notification to perform a second function when the rotation member 422 is rotated by 60 degrees from 0 degrees and is stopped. In addition, the processing module 720 may generate the event notification to perform the second function when the rotation member 422 is further rotated by 30 degrees from 30 degrees and is stopped.

According to one exemplary embodiment, the processing module 720 may determine rotation of the rotation member 422 based on at least part of the rotation information provided from the information providing module 710. According to one exemplary embodiment, the processing module 720 may determine the degree of rotation of the rotation member 422 based on the number of pieces of rotation information (for example, the number of pieces of raw data) collectable by the optical sensor. For example, when the optical sensor may collect 360 pieces of rotation information in total, one for each degree rotated by the rotation member, and a 360-degree rotation may be calculated with the pieces of rotation information, the processing module 720 may determine one piece of collected rotation information as a one-degree rotation of the rotation member 422. Specifically, when the optical sensor collects 180 pieces of rotation information, the processing module 720 may determine that the rotation member 422 is rotated by 180 degrees. Alternatively, when the optical sensor may collect 720 pieces of rotation information in total and a 360-degree rotation may be calculated with the pieces of rotation information, the processing module 720 may determine two pieces of collected rotation information as a one-degree rotation of the rotation member 422. Specifically, when the optical sensor collects 180 pieces of rotation information, the processing module 720 may determine that the rotation member 422 is rotated by 90 degrees.

According to one exemplary embodiment, the processing module 720 may correct the rotation information provided from the information providing module 710. According to one exemplary embodiment, when there is an error in the collected rotation information, the processing module 720 may correct the rotation information to account for the error.

According to one exemplary embodiment, an error occurring in the rotation information may be associated with the rotation speed of the rotation member 422. For example, when the rotation member 422 is rotated faster than a predetermined speed, the information providing module 710 may collect rotation information corresponding to a 17-degree rotation even though the rotation member 422 is actually rotated by 20 degrees. Alternatively, when the rotation member 422 is rotated slower than the predetermined speed, the information providing module 710 may not collect rotation information even though the rotation member 422 is actually rotated.

According to another exemplary embodiment, an error occurring in the rotation information may be associated with a delay in the rotation information. For example, when the rotation member 422 reaches the detent, rotation of the rotation member 422 may be interrupted by the detent and, accordingly, the information providing module 710 may have a delay in collecting the rotation information. For instance, although the information providing module 710 needs to collect the rotation information every predetermined time (for example, 11 ms), the rotation information may not be collected in a specific period or a delay may occur in collecting the rotation information in a specific period due to an interruption of rotation by the detent.

According to one exemplary embodiment, when a rotation state of the rotation member 422 does not satisfy a predetermined condition due to an error in the rotation information, the processing module 720 may correct the rotation information to determine that the rotation state is a rotation state satisfying the predetermined condition. For example, with the predetermined condition being a 15-degree rotation, even though a 14-degree rotation is detected due to a delay in the rotation information, the processing module 720 may correct the 14-degree rotation into a 15-degree rotation to generate an event notification. Correcting the rotation may be correcting accumulated rotation information corresponding to the 14-degree rotation into accumulated rotation information corresponding to the 15-degree rotation.

The control module 730 may perform a designated operation based on information (for example, the rotation information on the rotation member 422, the event notification, and the like) provided from the processing module 720. According to one exemplary embodiment, the control module 730 may perform a designated operation by running a predetermined application. For example, the control module 730 may perform a menu change, a screen switch, a mode change, screen brightness adjustment corresponding to corrected rotation information, and the like according to the rotation information on the rotation member 422 or the event notification.

According to one exemplary embodiment, the information providing module 710, the processing module 720, and the control module 730 of the processor 700 may be at least one software configuration executed by the processor 700. According to one exemplary embodiment, the processor 700 may include at least one module to determine the presence of an error in rotation information acquired corresponding to rotation of the rotation member 422, and to perform an operation of correcting the rotation information having the error. According to one exemplary embodiment, the electronic device 101 may determine the presence of an error in rotation information acquired corresponding to rotation of the rotation member 422 and may implement an operation of correcting the rotation information having the error using a separate module from the processor 700.

Figure 8A:
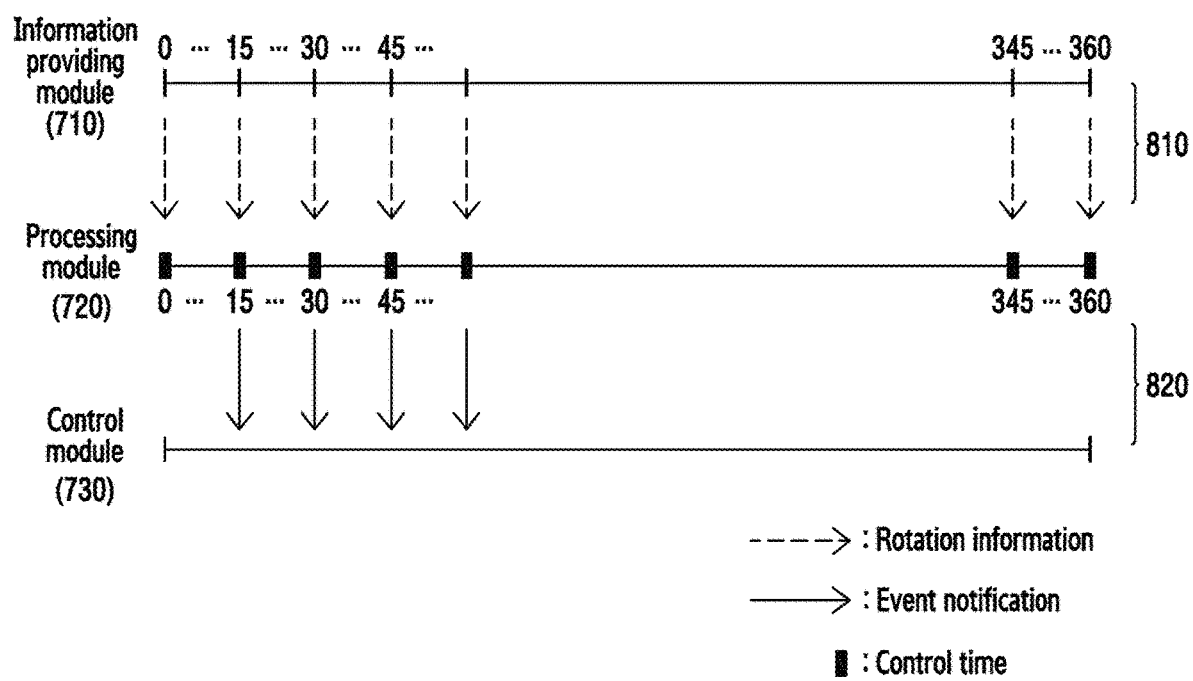
FIG. 8A and FIG. 8B are views illustrating an operation of a processor according to one exemplary embodiment of the present disclosure.
Figure 8B:
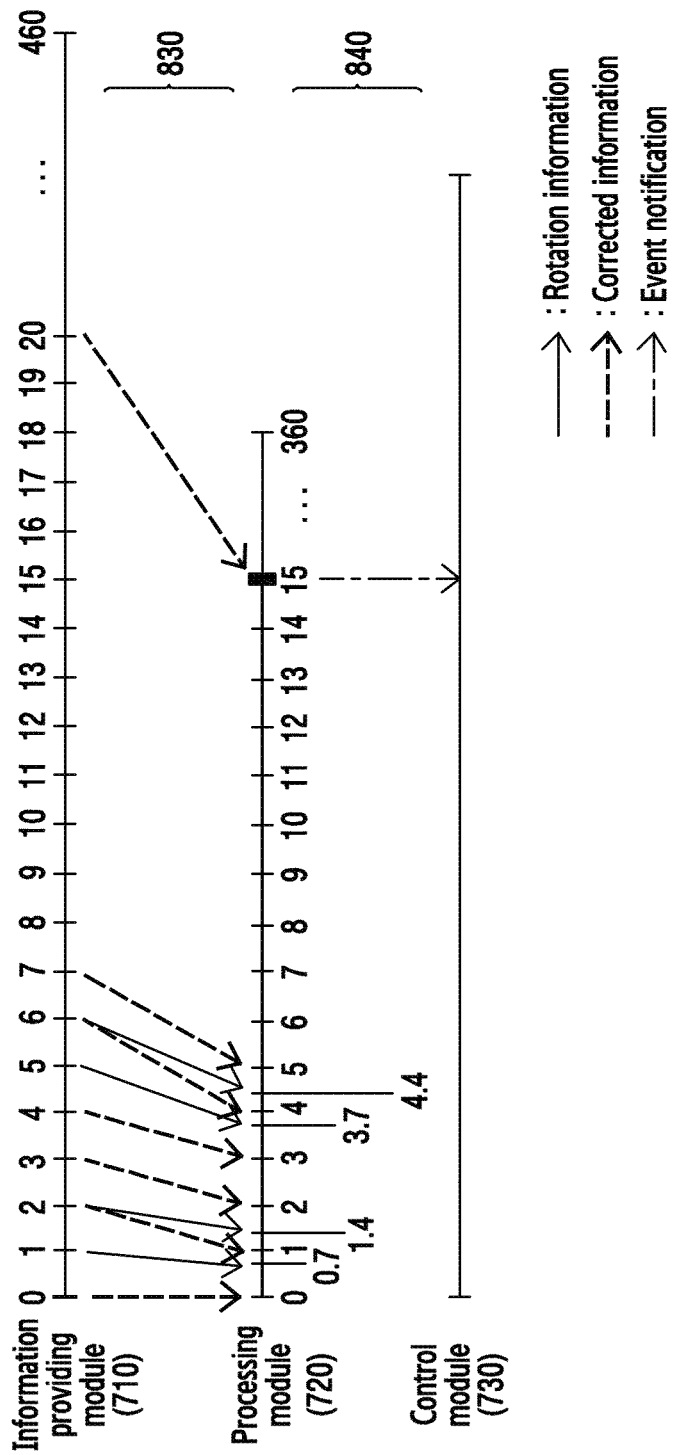

FIGS. 8A and 8B are views illustrating an operation of a processor according to one exemplary embodiment of the present disclosure.

FIG. 8A illustrates a case where a processor (for example, the processor 700) may acquire 360 pieces of rotation information in total, calculate a 360-degree rotation of a rotation member (for example, the rotation member 422), and perform 24 functions according to rotation of the rotation member 422. For example, the processor 700 may determine one piece of rotation information as a one-degree rotation of the rotation member 422 and may generate an event notification to perform a designated function whenever the rotation member 422 is rotated by 15 degrees.

According to one exemplary embodiment, the information providing module 710 of the processor 700 may acquire rotation information on the rotation member 422 and provide in step 810 the acquired rotation information for the processing module 720 based on a predetermined period. According to one exemplary embodiment, the rotation information may be a signal output from an optical sensor that senses an optical pattern (for example, 610a) of the rotation member 422 such as raw data.

According to one exemplary embodiment, the processing module 720 may accumulate the rotation information provided from the information providing module 710 and check a rotation state of the rotation member 422 based on the accumulated rotation information. According to one exemplary embodiment, the processing module 720 may calculate the rotation information as angle-based data to accumulate the rotation information. The angle-based data is data obtained by expressing the rotation information in a rotation angle of the rotation member 422. When it is possible to rotate the rotation member 422 by 360 degrees, the processing module 720 may calculate angle-based data having 360 values.

According to one exemplary embodiment, when rotation information or angle-based data corresponding to a predetermined condition (for example, a rotation angle to cause an event notification) is accumulated, the processing module 720 may provide in step 820 an event notification for the control module 730. For example, since the processing module 720 may calculate angle-based data corresponding to one degree per one piece of rotation information, the processing module 720 may generate the event notification to perform a designated function whenever rotation information corresponding to an angle of 15 degrees is collected.

According to one exemplary embodiment, the control module 730 may perform the designated function based on the event notification provided from the processing module 720.

According to one exemplary embodiment, as illustrated in FIG. 8A, when the processor 700 may acquire 360 pieces of rotation information in total, calculate a 360-degree rotation of the rotation member 422, and perform 12 functions according to rotation of the rotation member 422, the processor 700, for example, may determine one piece of rotation information as a one-degree rotation of the rotation member 422 and generate an event notification to perform a designated function whenever the rotation member 422 is rotated by 30 degrees.

FIG. 8B illustrates an embodiment where the processor 700 may acquire 460 pieces of rotation information in total, calculate a 360-degree rotation of the rotation member 422, and perform 24 functions according to rotation of the rotation member 422. For example, the processor 700 may determine one piece of rotation information as a 0.7826-degree rotation of the rotation member 422 and generate an event notification to perform a designated function whenever the rotation member 422 is rotated by 15 degrees.

According to one exemplary embodiment, the information providing module 710 of the processor 700 may acquire rotation information on the rotation member 422 and provide in step 830 the acquired rotation information for the processing module 720 based on a predetermined period. According to one exemplary embodiment, the rotation information may be a signal output from an optical sensor that senses an optical pattern (for example, 610a) of the rotation member 422 such as raw data.

According to one exemplary embodiment, the processing module 720 may accumulate the rotation information provided from the information providing module 710 and check a rotation state of the rotation member 422 based on the accumulated rotation information.

According to one exemplary embodiment, the processing module 720 may calculate angle-based data corresponding to 0.7826 degrees per one piece of rotation information and accumulate angle-based data until the rotation member 422 stops. According to one exemplary embodiment, the processing module 720 may accumulate only part of the calculated angle-based data. According to one exemplary embodiment, the processing module 720 may accumulate only angle-based data including an integer. For example, angle-based data with respect to first acquired rotation information may be 0.7826, and angle-based data with respect to second acquired rotation information may be a multiple of 0.7826. Since the angle-based data with respect to the first acquired rotation information is 0.7826, which includes no integer, the processing module 720 does not accumulate the angle-based data with respect to the first acquired rotation information but accumulates the angle-based data with respect to the second acquired rotation information, 1.5652 (=0.7826×2), which includes an integer. For example, when accumulating angle-based data including an integer, the processing module 720 may adjust the angle-based data into an integer. Specifically, the processing module 720 may adjust the angle-based data with respect to the second acquired rotation information, 1.5652 (=0.7826× 2), into 1, and adjust angle-based data with respect to third acquired rotation information, 2.3478 (0.7826×3), into 2. Alternatively, the processing module 720 may accumulate only a designated value (for example, the first decimal value) of angle-based data and discard the remaining value. Specifically, when the first rotation information is acquired, the processing module 720 may accumulate only 0.7 and discard the remaining value 0.0826. According to one exemplary embodiment, when a discarded value is a certain value or greater, the processing module 720 may additionally accumulate angle-based data. For example, when ninth rotation information is acquired, accumulated angle-based data is 6.3 (=0.7×9) and an accumulated discarded value is 0.7434 (=0.0826×9). As the accumulated discarded value is almost equivalent to an accumulated reference value (0.7), the processing module 720 may change the accumulated angle-based data from 6.3 to 7.0. According to one exemplary embodiment, the processing module 720 may re-accumulate or discard a portion (for example, 0.0434) of the accumulated discarded value (for example, 0.7434).

According to one exemplary embodiment, when rotation information or angle-based data corresponding to a predetermined condition (for example, a rotation angle to cause an event notification) is accumulated, the processing module 720 may provide in step 840 an event notification for the control module 730.

According to one exemplary embodiment, the control module 730 may perform the designated function based on the event notification provided from the processing module 720.

An electronic device according to various exemplary embodiments may include: a housing including one side having a substantially circular opening; a substantially circular structure configured to be rotatably positioned in or around the opening of the housing; a first sensor configured to detect a first rotation of the structure to generate a first signal; a second sensor configured to detect a second rotation of the structure, to generate a second signal; a processor coupled to the first sensor and the second sensor; and a memory coupled to the processor, wherein the memory includes instructions to enable the processor, on execution, to detect the rotation of the structure based on at least a part of the first signal or a part of the second signal, to correct the first signal to reflect actual rotation of the structure, and to perform a predetermined action based on at least part of the corrected first signal.

According to one exemplary embodiment, when the first signal indicates that the structure is rotated by a selected first value or greater, the instructions may enable the processor to correct the first signal to indicate that the structure is rotated by a second value greater than the first value.

According to one exemplary embodiment, the instructions may enable the processor to correct the first signal based on at least a part of the second signal.

According to one exemplary embodiment, the first sensor may include an optical sensor.

According to one exemplary embodiment, the second sensor may include at least one of a geomagnetic sensor, an accelerometer, a noise sensor, and an inertial sensor.

According to one exemplary embodiment, the structure may include a plurality of grooves configured to cooperate with a plurality of detents and/or magnetic members configured to face the opening of the housing and to be installed at regular intervals, and generates feedback caused at least in part by the grooves or magnetic members when the structure is rotated.

According to one exemplary embodiment, the rotation of the structure may be associated with at least one of rotation speed, a rotation direction, degree of rotation, and a rotation position.

According to one exemplary embodiment, the second sensor may operate while the structure is rotated.

An electronic device according to various exemplary embodiments may include: a housing including one side having a substantially circular opening; a rotation member rotatably coupled to the housing; a first sensor configured to detect a rotation of the rotation member to generate a first signal; a processor coupled to the first sensor; and a memory coupled to the processor, wherein the memory includes instructions to enable the processor, on execution, to detect the rotation of the rotation member based on at least a part of the first signal and to correct the first signal into a second signal when the first signal is temporarily not generated while the rotation member is rotated.

According to one exemplary embodiment, the rotation member may include a plurality of grooves configured to cooperate with a plurality of detents configured to be installed at regular intervals, and the instructions may enable the processor to determine that the rotation member is rotated with the detents based on the corrected second signal.

According to one exemplary embodiment, the instructions may enable the processor to operate a second sensor configured to detect a physical change different from the rotation of the rotation member corresponding to the first signal.

According to one exemplary embodiment, the instructions may enable the processor to determine that the first signal is not generated based on the physical change generated by the second sensor.

According to one exemplary embodiment, the rotation member may be positioned in the opening of the housing or on a lateral side of the housing.

According to one exemplary embodiment, the instructions may enable the processor to perform a predetermined operation corresponding to the second signal.

Figure 9:
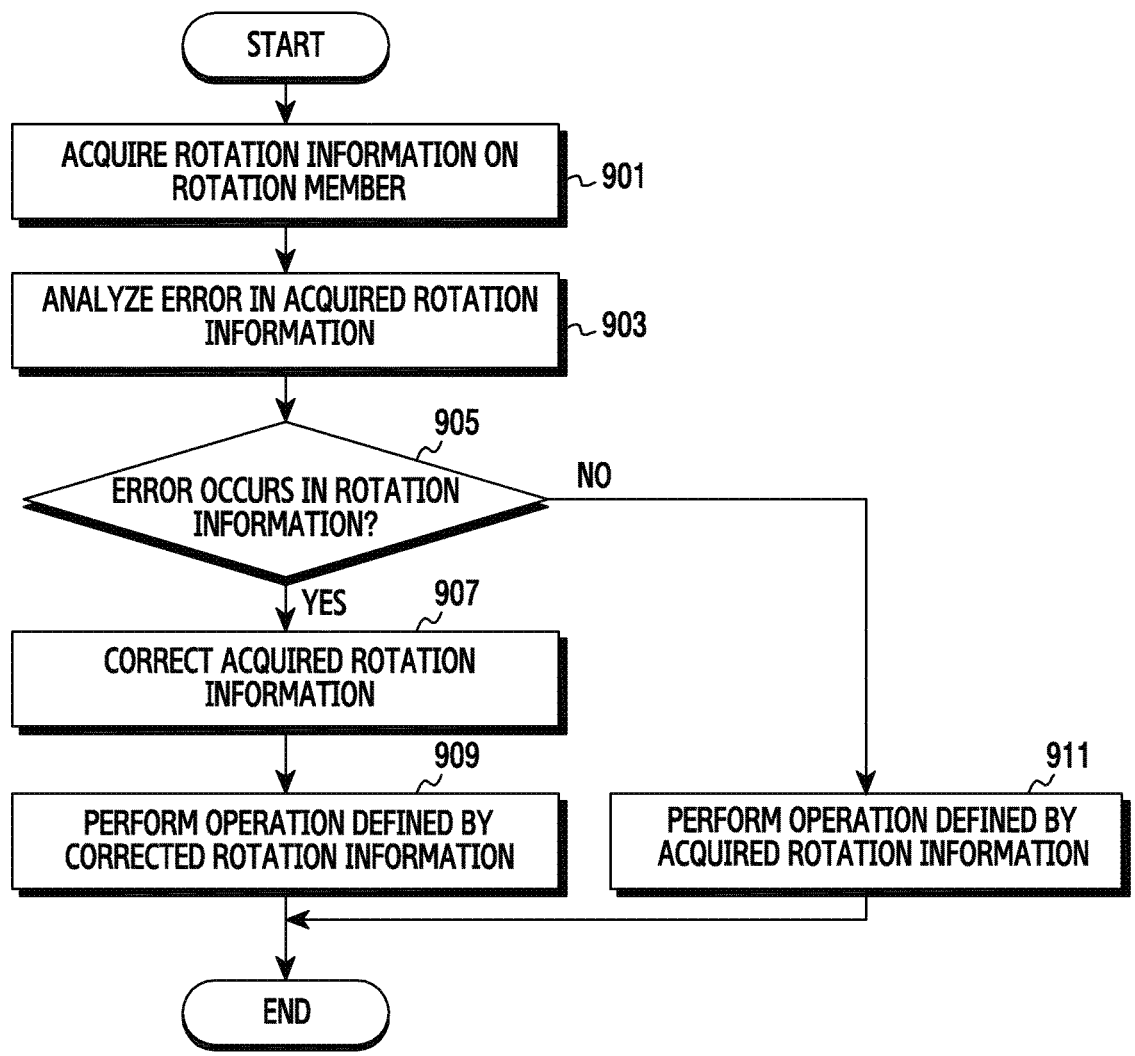
FIG. 9 is a flowchart illustrating a procedure for performing a method of sensing rotation of a rotation member according to one exemplary embodiment of the present disclosure.

FIG. 9 is a flowchart illustrating an operation for performing a method of sensing rotation of a rotation member according to one exemplary embodiment of the present disclosure.

In operation 901, an electronic device (for example, the electronic device 400) may acquire rotation information on a rotation member (for example, the rotation member 422). According to one exemplary embodiment, the rotation information may be information used to determine a rotation parameter of the rotation member 422 that is physically rotated. For example, the rotation parameter may include at least one of a rotation direction, rotation speed, the degree of rotation, and a rotated position.

According to one exemplary embodiments, the rotation information may be information acquired through an optical sensor that senses an optical pattern 610*a* of the rotation member 422. In one embodiment, the optical sensor may include a light emitter that emits light and a light receiver that receives the light from the light emitter, and the electronic device 400 may acquire an output signal output from the optical sensor (an electrical signal generated from the optical sensor) as the rotation information. According to one exemplary embodiment, the electronic device 400 may receive, from the optical sensor, an output signal having a pattern corresponding to the optical pattern 610*a* rotating along with the rotation member 422. The output signal output from the optical sensor may be raw data. According to one exemplary embodiment, the electronic device 400 may acquire the rotation information until the rotation member 422 stops.

In operation 903, the electronic device 400 may perform an error analysis operation with respect to the acquired rotation information. According to one exemplary embodiment, the error analysis operation may be an operation of determining whether the rotation information obtained based on at least part of the information acquired from the optical sensor reflects the exact rotation of the rotation member 422. For example, the information acquired from the optical sensor may be information acquired when the optical sensor does not accurately sense the rotation of the rotation member.

According to one exemplary embodiment, an error in the rotation information may be associated with the rotation speed of the rotation member 422. For example, the rotation information may be lost by rotation of the rotation member 422 that exceeds a certain speed or may be acquired after a delay by slow rotation of the rotation member 422.

According to one exemplary embodiment, the electronic device 400 may determine that an error occurs in the rotation information when time required to acquire the rotation information does not satisfy a predetermined condition. When the required time is greater than a predetermined threshold, the electronic device 400 may determine that the rotation member 422 is rotated too slowly, which caused an error in the rotation information. When the required time is less than the predetermined threshold, the electronic device 400 may determine that the rotation member 422 is rotated too quickly, which also caused an error in the rotation information.

According to another exemplary embodiment, the electronic device 400 may determine that an error occurs in the rotation information when the rotation information is temporarily not acquired, which may indicate that the rotation member did not rotate. According to various exemplary embodiments, the rotation information temporarily not being acquired may mean that the rotation information is not acquired during a specific period. According to one exemplary embodiment, the specific period may be in between periods in which the rotation information is acquired. For example, when the rotation information is acquired in each period at three time intervals, the rotation information may be acquired in a first period, may not be acquired in a second period (i.e. indicating that the rotation member did not rotate), and may be acquired in a third period. In this case, the second period may be the specific period in which the rotation information is temporarily not acquired.

According to still another exemplary embodiment, the electronic device 400 may determine that an error occurs in the rotation information when the rotation information is acquired after a delay in a specific period. According to various exemplary embodiments, a delay in acquiring the rotation information may mean that the rotation information is acquired after a certain period of time since a rotation information acquiring period starts. For example, a delay in acquiring the rotation information may refer to a case where the rotation information is not acquired within a certain period of time after the rotation information acquiring period starts, and thus a reattempt to acquire the rotation information is made to acquire the rotation information. According to one exemplary embodiment, the electronic device 400 may operate the light emitter of the optical sensor to reattempt to acquire the rotation information.

In operation 905, the electronic device 400 may determine whether there is an error in the rotation information. For example, when there is an error in the acquired rotation information as a result of error analysis in operation 903, the electronic device 400 may determine that it is necessary to correct the rotation information due to the error in the rotation information.

When it is determined that there is no error or no correction is necessary in operation 905, the electronic device 400 may perform a designated operation based on the acquired rotation information in operation 911. According to one exemplary embodiment, the electronic device 400 may perform a designated operation corresponding to the rotation information acquired according to the determination that the rotation information does not need correcting. According to one exemplary embodiment, the designated operation may be an operation of detecting a detent. For example, the electronic device 400 may detect the detent using the rotation information and perform a function corresponding to the detection of the detent. According to one exemplary embodiment, the electronic device 400 may detect the detent using accumulated rotation information. According to one exemplary embodiment, the electronic device 400 may store the degree of rotation of the rotation member 422 designated in advance to detect the detent. For example, rotation degrees corresponding to respective detents disposed at regular intervals may be designated below in Table 1.

TABLE 1

| Number of detents/number of control functions | Unit for sensing detent (degree of rotation) |
|---|---|
| 12 | 30 |
| 24 | 15 |

Table 1 illustrates that when there are 12 detents disposed in the electronic device 400, the rotation member 422 is positioned on the detents whenever the rotation member 422 is rotated by 30 degrees; and when there are 24 detents disposed in the electronic device 400, the rotation member 422 is positioned on the detents whenever the rotation member 422 is rotated by 15 degrees. Accordingly, the electronic device 400 may determine that the detents are detected when it is determined that the rotation information is accumulated corresponding to a predetermined degree of rotation.

According to one exemplary embodiment, the designated operation may be an operation of controlling a function of the electronic device 400. According to one exemplary embodiment, the electronic device 400 may provide the rotation information for a corresponding application, thereby performing the designated operation. According to various exemplary embodiments, the designated operation may include a menu change, a screen switch, a mode change, screen brightness adjustment corresponding to the rotation information, and the like. According to various exemplary embodiments, the electronic device 400 may predetermine and store the designated operation corresponding to the rotation information.

When it is determined that there is an error or that a correction is necessary in operation 905, the electronic device 400 may correct the acquired rotation information in operation 907. According to one exemplary embodiment, when it is determined that there is an error in the acquired rotation information and thus the rotation information needs correcting, the electronic device 400 may correct the acquired rotation information. According to one exemplary embodiment, correcting the rotation information may be correcting rotation information acquired when a delay in the rotation occurs. According to one exemplary embodiment, the corrected rotation information may have a greater value than the non-corrected rotation information. A greater value may mean that a greater number of pieces of rotation information are accumulated, or mean that the corrected rotation information indicates that the rotation member was rotated more than the non-corrected rotation information would indicate. According to one exemplary embodiment, the electronic device 400 may correct the accumulated rotation information to calculate the degrees of rotation corresponding to the detent. According to one exemplary embodiment, when the rotation member 422 is rotated by 15 degrees but rotation information corresponding to a 14-degree rotation is acquired due to a delay, the electronic device 400 may correct the rotation information corresponding to the 14-degree rotation into rotation information corresponding to a 15-degree rotation. For example, when the rotation member 422 passes through the detent to cause a time delay in rotation, the electronic device 400 may correct the accumulated rotation information. Alternatively, when the rotation member 422 passes through the detent so that rotation information is not acquired in a specific period, the electronic device 400 may correct the rotation information to detect the detent. Alternatively, when the rotation member 422 passes through the detent to cause a delay in acquiring the rotation information in a specific period, the electronic device 400 may correct the rotation information to detect the detent.

In operation 909, the electronic device 400 may perform a designated operation based on the corrected rotation information. According to one exemplary embodiment, according to corrected rotation information, the electronic device 400 may perform a designated operation corresponding to the corrected rotation information. For example, when the electronic device 400 does not correct the rotation information indicating the rotation of the rotation member 422, the electronic device 400 may select and play first data (for example, a fourth piece of music on a play list) corresponding to the rotation information on the rotation member 422. However, when the electronic device 400 determines that the rotation information needs correcting, the electronic device 400 may correct the rotation information and select and play second data (for example, a fifth piece of music on the play list). Alternatively, when the electronic device 400 does not correct the rotation information indicating the rotation of the rotation member 422, the electronic device 400 operates in a first mode (for example, a sound mode) corresponding to the rotation information on the rotation member 422. However, when the electronic device 400 determines that the rotation information needs correcting, the electronic device 400 may correct the rotation information to switch to a second mode (for example, a vibration mode).

Figure 10:
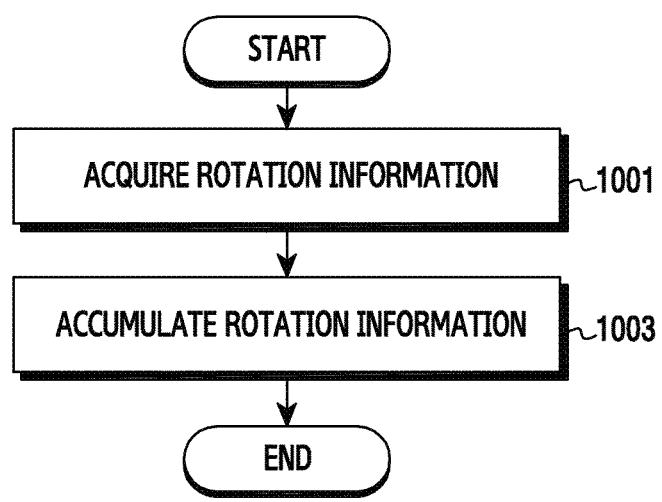
FIG. 10 is a flowchart illustrating a procedure for performing a method of acquiring rotation information according to one exemplary embodiment of the present disclosure.

FIG. 10 is a flowchart illustrating an operation for performing a method of acquiring rotation information according to one exemplary embodiment of the present disclosure. According to one exemplary embodiment, the operation for performing the method of acquiring the rotation information may be a detailed operation of operation 901 illustrated in FIG. 9.

In operation 1001, an operation of acquiring rotation information on an electronic device (for example, the electronic device 400) may be performed. According to one exemplary embodiment, the electronic device 400 may acquire rotation information on a rotation member (for example, the rotation member 422) that is physically rotated. For example, the acquirable rotation information may include at least one of the degree of rotation, a rotation direction, rotation speed, and a rotated position.

In operation 1003, the electronic device 400 may perform an operation of accumulating the rotation information. According to one exemplary embodiment, the electronic device 400 may accumulate the rotation information acquired at predetermined time intervals. According to another exemplary embodiment, the operation of accumulating the rotation information may further include an operation of accumulating and storing the rotation information in the electronic device or another electronic device functionally connected.

According to one exemplary embodiment, the electronic device 400 may use the accumulated rotation information in performing an operation of analyzing an error in rotation information.

Figure 11:
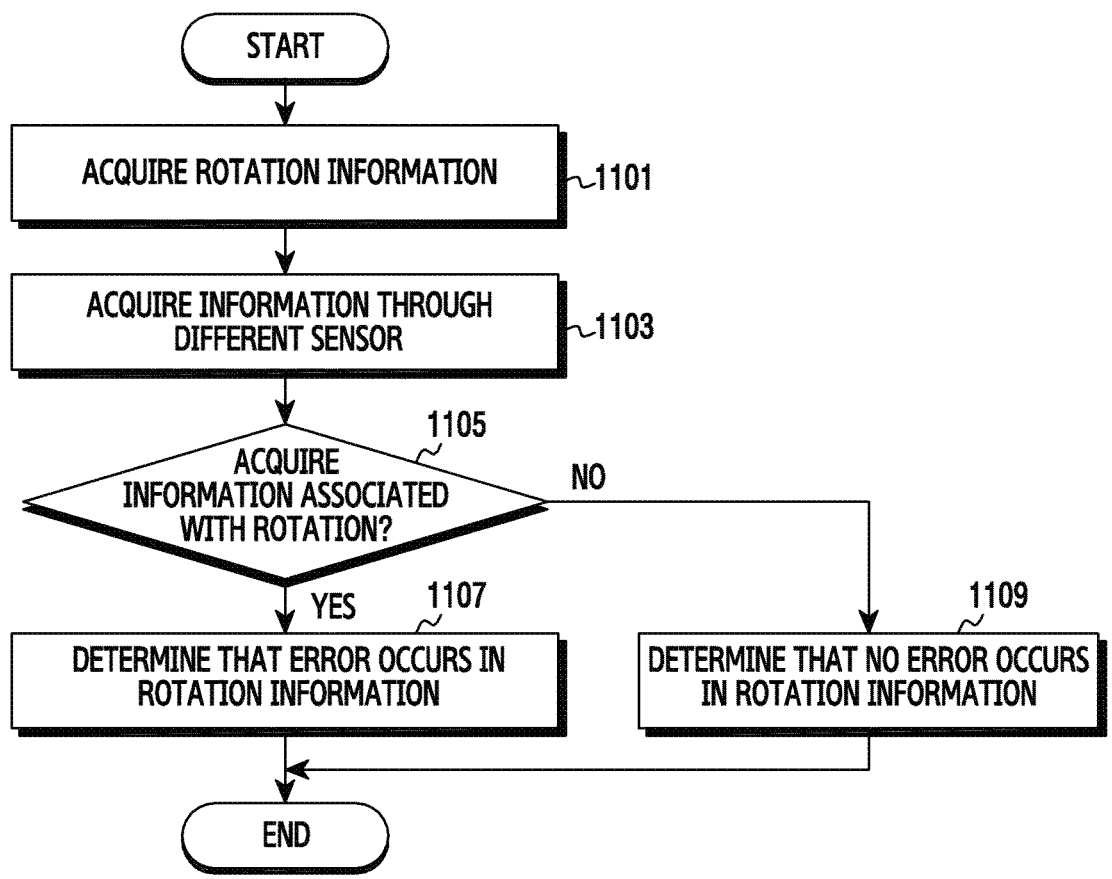
FIG. 11 is a flowchart illustrating another procedure for performing a method of acquiring rotation information according to one exemplary embodiment of the present disclosure.

FIG. 11 is a flowchart illustrating an operation of analyzing an error in rotation information according to one exemplary embodiment of the present disclosure. According to one exemplary embodiment, the operation of analyzing the error in the rotation information is an operation of determining whether rotation information is lost due to the rotation speed of a rotation member (for example, the rotation member 422 is rotated too quickly by the user) or whether rotation information is acquired after a delay. FIG. 11 may be a detailed operation of operation 903 illustrated in FIG. 9.

In operation 1101, an electronic device (for example, the electronic device 400) may perform an operation of acquiring rotation information on the rotation member 422 that is physically rotated.

In operation 1103, the electronic device 400 may acquire information through a different sensor. According to one exemplary embodiment, the electronic device 400 may operate at least one other sensor corresponding to the operation of acquiring the rotation information. According to one exemplary embodiment, the electronic device 400 may operate the other sensor together with the sensor for acquiring the rotation information, for example, the optical sensor. For example, the other sensor is a sensor that is different from the sensor acquiring the rotation information and may include at least one of a magnetic sensor that detects a magnetic field around the electronic device 400, an accelerometer that outputs an electrical signal according to three-axial acceleration caused by a movement of the electronic device 400, an inertial sensor that outputs an electrical signal according to a three-axial position change caused by a movement of the electronic device 400, or a noise sensor (for example, a microphone) that detects ambient noise around the electronic device 400. An operating time for the other sensor to determine a rotation state of the rotation member 422 is not limited to a time after the rotation information is acquired by the first sensor. For example, the electronic device 400 may acquire information associated with rotation while the other sensor is operating.

In operation 1105, the electronic device 400 may determine whether information associated with the rotation is acquired. For example, the electronic device 400 may determine whether the information acquired by the other sensor is information associated with the rotation. According to one exemplary embodiment, the electronic device 400 may determine whether information generated by the rotation of the rotation member 422 is acquired through the other sensor. According to one exemplary embodiment, the information generated by the rotation of the rotation member 422 may be information associated with the start and the end of the rotation of the rotation member 422. According to one exemplary embodiment, when information associated with a sound change, a vibration change, a magnetic field change, and the like caused by the rotation member 422 is detected, the electronic device 400 may determine that the information generated by the rotation is acquired by the other sensor. For example, the electronic device 400 may detect a designated magnetic value or a magnetic field change by a magnetic object, such as the rotation member 422 or electronic device 400, corresponding to the rotation of the rotation member 422. Alternatively, the electronic device 400 may detect a designated vibration or a vibration change when the electronic device 400 is gripped or the rotation member 422 is rotated with the gripped electronic device 400. Alternatively, the electronic device 400 may detect a sound or a sound change caused by a detent when the rotation member 422 is rotated.

When the information associated with the rotation is not acquired in operation 1105, the electronic device 400 may determine that no error occurs in the rotation information in operation 1109. According to various exemplary embodiments, the electronic device 400 may determine that no error occurs in the rotation information and may perform an operation defined by the acquired rotation information.

When the information associated with the rotation is acquired by the other sensor in operation 1105, the electronic device 400 may determine that an error occurs in the rotation information in operation 1107. According to one exemplary embodiment, the electronic device 400 may determine that an error occurs in the rotation information, correct the acquired rotation information, and perform an operation defined by the corrected rotation information.

Figure 12:
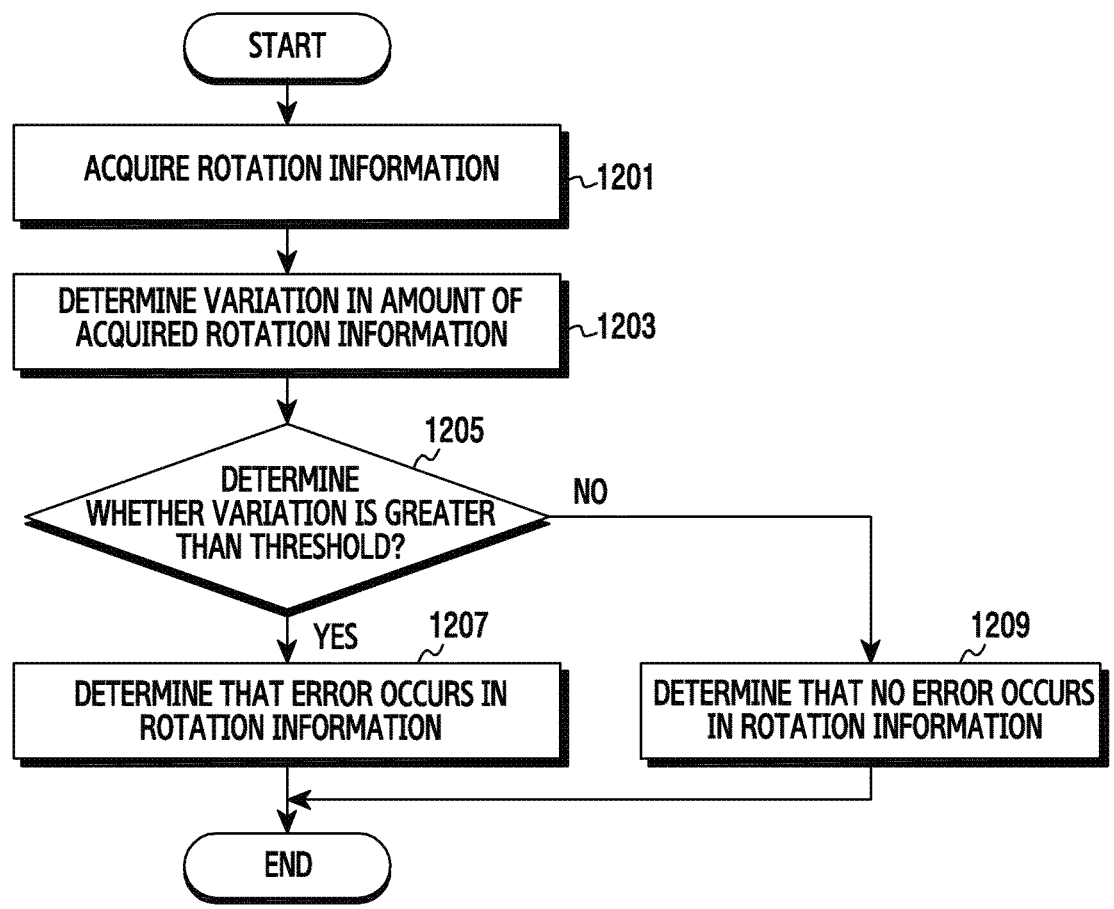
FIG. 12 is a flowchart illustrating a procedure for performing a method of analyzing an error in rotation information according to one exemplary embodiment of the present disclosure.

FIG. 12 is a flowchart illustrating an operation of determining an error in the rotation information according to one exemplary embodiment of the present disclosure. According to one exemplary embodiment, the operation of determining the error in the rotation information is an operation of determining whether rotation information is lost due to the rotation speed of a rotation member 422 or whether rotation information is acquired after a delay. FIG. 12 may be a detailed operation of operation 903 illustrated in FIG. 9.

In operation 1201, an electronic device (for example, the electronic device 400) may perform an operation of acquiring rotation information on the rotation member 422 that is physically rotated. According to one exemplary embodiment, the electronic device 400 may acquire and accumulate the rotation information based on a predetermined period.

In operation 1203, the electronic device 400 may determine a variation in the amount of acquired rotation information. According to one exemplary embodiment, the amount of acquired rotation information may be the number of pieces of rotation information acquired in each period. When the rotation member 422 reaches the detent, rotation of the rotation member 422 is interrupted by the detent so that the number of pieces of rotation information acquired by the electronic device 400 may decrease. According to one exemplary embodiment, the electronic device 400 may determine a variation in the rotation information based on the numbers of pieces of rotation information acquired in a current period and a previous period. For example, the electronic device 400 may determine whether a difference between the numbers of pieces of rotation information acquired in the two periods is greater than a threshold. According to another exemplary embodiment, the amount of acquired rotation information may be time information required to acquire rotation information. When the rotation member 422 reaches the detent, rotation of the rotation member 422 is interrupted by the detent, so that the electronic device 400 may not acquire rotation information or may have a delay in acquiring rotation information. According to various exemplary embodiments, the electronic device 400 may determine a time to start acquiring rotation information in each period.

In operation 1205, the electronic device 400 may perform an operation of determining whether a variation in the rotation information is greater than the threshold. According to one exemplary embodiment, the electronic device 400 may determine whether the number of pieces of acquired rotation information in a specific period is less than a predetermined threshold. According to another exemplary embodiment, the electronic device 400 may determine whether there is a specific period in which rotation information is acquired after a delay of a designated time (i.e. a time threshold) or longer.

When the variation is less than the threshold in operation 1205, the electronic device 400 may determine that no error occurs in rotation information in operation 1209. According to one exemplary embodiment, the electronic device 400 may determine that no error occurs in the rotation information and may perform an operation defined by the acquired rotation information.

When the variation is greater than the threshold operation 1205, the electronic device 400 may determine that an error occurs in the rotation information. According to one exemplary embodiment, the electronic device 400 may determine that an error occurs in the rotation information, correct the acquired rotation information, and perform an operation defined by the corrected rotation information.

Figure 13:
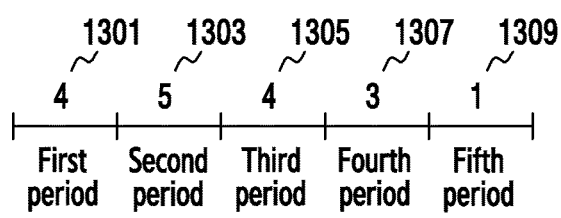
FIG. 13 is a view illustrating an operation of determining an error in rotation information according to one exemplary embodiment of the present disclosure.

FIG. 13 is a view illustrating an operation of determining an error in rotation information according to one exemplary embodiment of the present disclosure.

For example, as illustrated in FIG. 13, an electronic device (for example, the electronic device 400) may acquire rotation information in each predetermined period (for example, every 11 ms).

As illustrated, the electronic device 400 may acquire 1301 four pieces of rotation information in a first period, acquire 1303 five pieces of rotation information in a second period, acquire 1305 four pieces of rotation information in a third period, acquire 1307 three pieces of rotation information in a fourth period, and acquire 1309 one piece of rotation information in a fifth period.

According to one exemplary embodiment, the electronic device 400 may determine that a delay in rotation of a rotation member 422 occurred in a period having a variation in the number of pieces of rotation information greater than a threshold. As illustrated, the three pieces of rotation information acquired in the fourth period as compared with the four pieces of rotation information acquired in the third period, which may indicate that the variation is not significant. However, the one piece of rotation information acquired in the fifth period as compared with the three pieces of rotation information acquired in the fourth period, which may indicate that the variation is significant. In this case, the electronic device 400 may determine that a delay in rotation occurs between the fourth period and the fifth period, and thus there is an error in the rotation information acquired in the fifth period.

Figure 14:
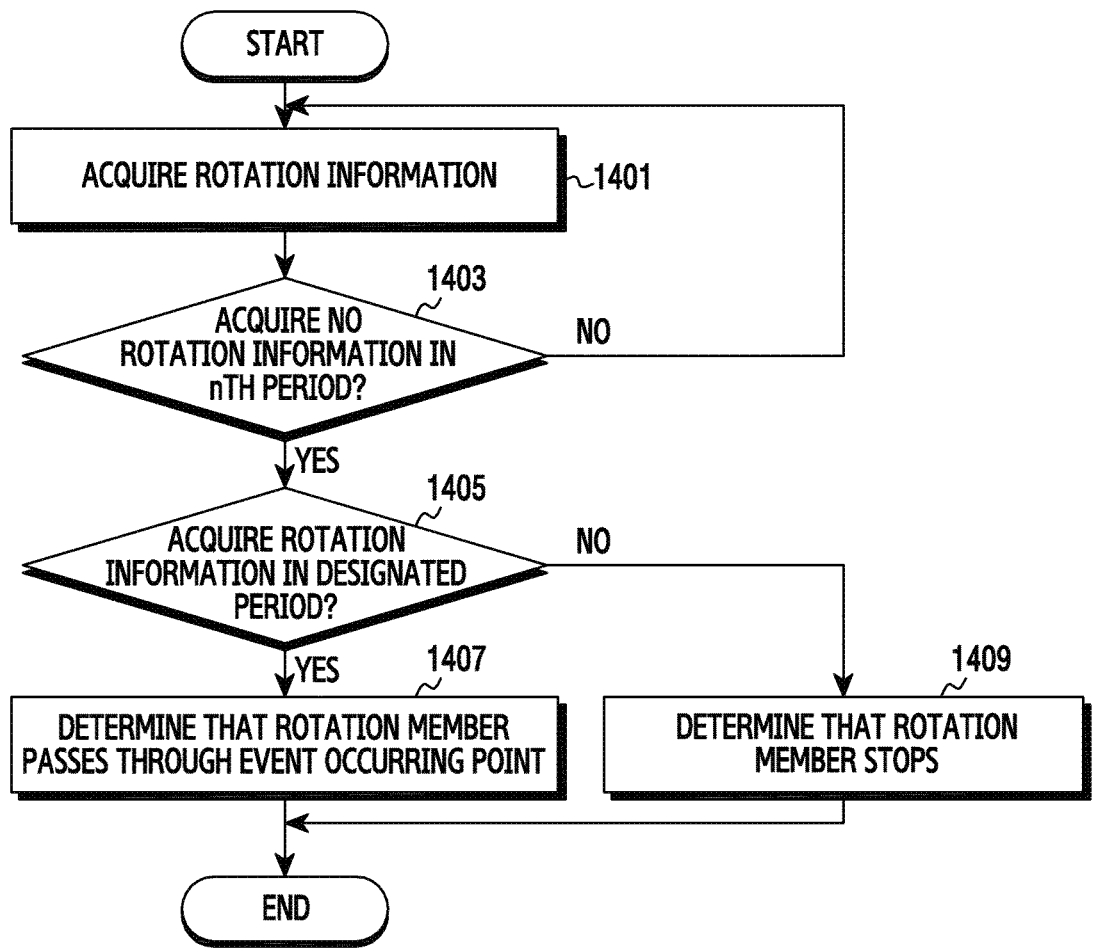
FIG. 14 is a flowchart illustrating another procedure for performing a method of analyzing an error in rotation information according to one exemplary embodiment of the present disclosure.

FIG. 14 is a flowchart illustrating an operation of analyzing an error in the rotation information according to one exemplary embodiment of the present disclosure. According to one exemplary embodiment, the operation of analyzing the error in the rotation information may be a detailed operation of operation 903 illustrated in FIG. 9.

In operation 1401, an electronic device (for example, the electronic device 400) may acquire rotation information. For example, the electronic device 400 may acquire rotation information on the rotation member 422 from an optical sensor in designated periods and may accumulate the rotation information.

In operation 1403, the electronic device 400 may determine whether the rotation information is not acquired in a current period (for example, at an nth period). According to one exemplary embodiment, the electronic device 400 may determine whether the rotation information is acquired within a certain period of time after a specific period for acquiring the rotation information starts, thereby determining whether the rotation information is acquired in the period.

When no rotation information is acquired in operation 1403, the electronic device 400 may determine whether the rotation information is acquired in a designated period (for example, an n+1th period, an n+2th period, and the like) in operation 1405. The electronic device 400 may determine whether the rotation information is temporarily not acquired in at least one period within a certain range from the nth period since rotation of the rotation member (for example, the rotation member 422) is interrupted by the detent.

When the rotation information is acquired in the designated period in operation 1405, the electronic device 400 may determine that the rotation member 422 passes through an event occurring point in operation 1407. The event occurring point is a rotation position of the rotation member 422 for performing a designated function. For example, the electronic device 400 may determine that the rotation member 422 passes through the detent. According to one exemplary embodiment, the electronic device 400 may determine that the rotation member 422 passes through the detent in a specific period in which the rotation information is temporarily not acquired. According to various exemplary embodiments, when it is determined that the rotation member 422 passes through the detent, the electronic device 400 may correct the rotation information accordingly and may perform an operation corresponding to the corrected rotation information. For example, even though the electronic device 400 acquires no rotation information as the rotation member 422 passes through the detent, the electronic device 400 may correct the rotation information to cause an event notification.

When no rotation information is acquired in the designated period in operation 1405, the electronic device 400 may determine that the rotation member 422 stops in operation 1409. According to one exemplary embodiment, when it is determined that no rotation information is acquired in the designated period, the electronic device 400 may determine that the rotation member 422 stopped and may perform an operation corresponding to the accumulated rotation information.

Figure 15:
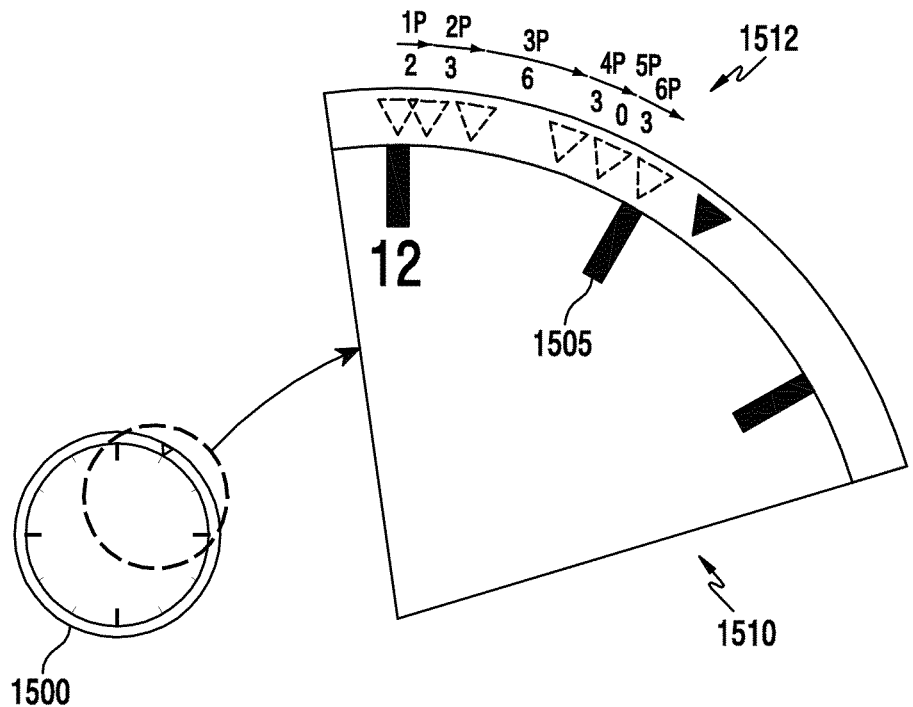
FIG. 15 is a view illustrating an operation of determining an error in rotation information according to one exemplary embodiment of the present disclosure.

FIG. 15 is a view illustrating a situation where rotation information is not sensed in a designated time period according to one exemplary embodiment of the present disclosure.

For example, as illustrated in FIG. 15, assuming a situation 1500 where a rotation member (for example, the rotation member 422) is rotated to a first detent (for example, the one o'clock position 1505 on a clock image), an electronic device (for example, the electronic device 400) may acquire two pieces of rotation information in a first period (11 ms), three pieces of rotation information in a second period (22 ms), six pieces of rotation information in a third period (33 ms), and three pieces of rotation information in a fourth period (44 ms). According to various exemplary embodiments, when no rotation information is acquired in a fifth period and three pieces of rotation information are acquired in a sixth period (1510), the electronic device 400 may determine that no rotation information is acquired in the fifth period because there was a delay in rotation caused by the rotation member going over a detent. The electronic device 400 may determine that the rotation member 422 passes through the detent in at least one period (for example, the fifth period) based on the fifth period in which no rotation information is acquired. According to one exemplary embodiment, the electronic device 400 may provide a corresponding application with a result of determining that the rotation member 422 passes through the detent to perform an operation corresponding to rotation of the rotation member 422.

Figure 16:
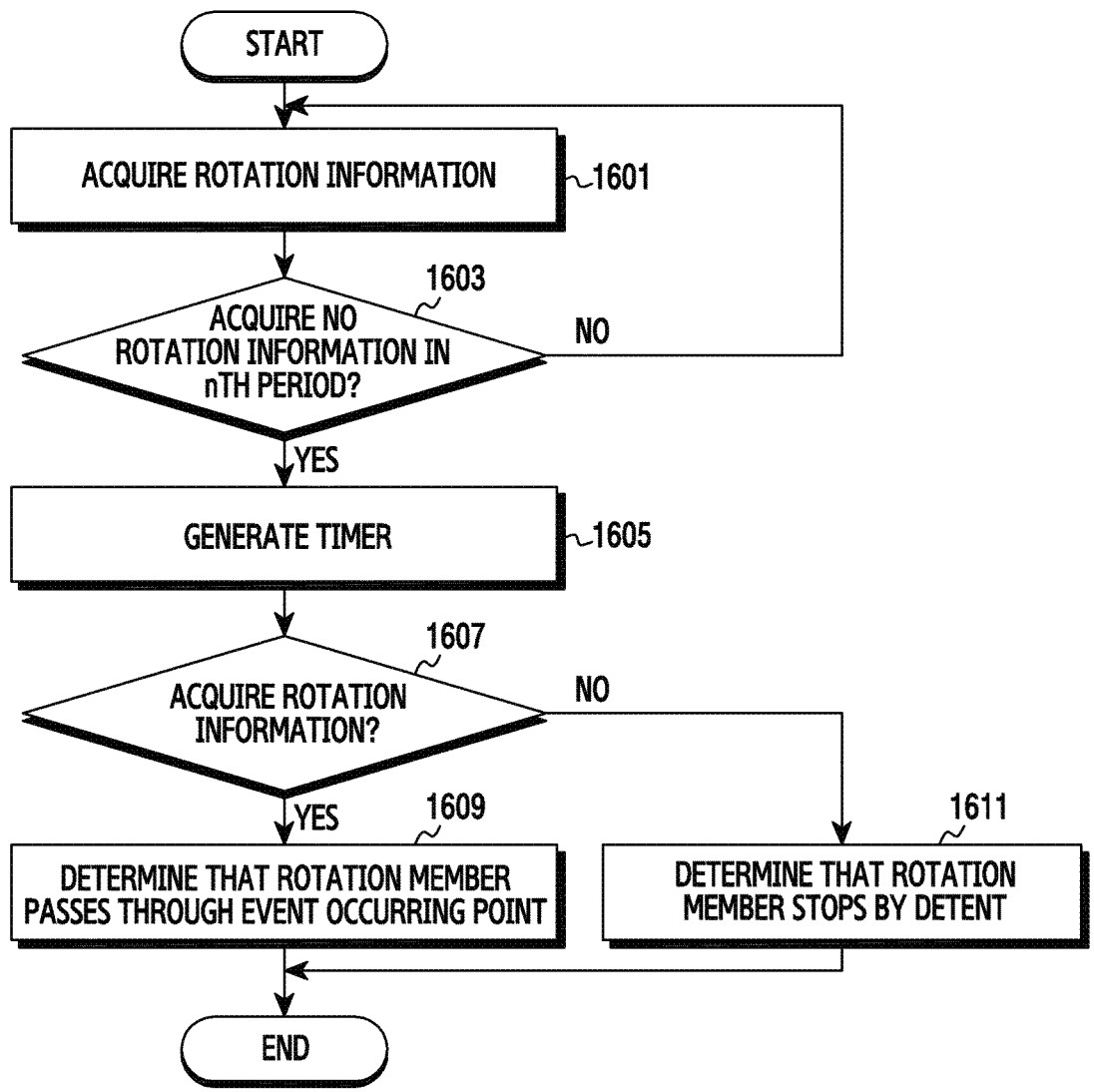
FIG. 16 is a flowchart illustrating still another procedure for performing a method of analyzing an error in rotation information according to one exemplary embodiment of the present disclosure.

FIG. 16 is a flowchart illustrating an operation of analyzing an error in rotation information according to one exemplary embodiment of the present disclosure. The operation of analyzing the error in the rotation information shown in the embodiment in FIG. 16 may be a detailed operation of operation 903 illustrated in FIG. 9.

In operation 1601, an electronic device (for example, the electronic device 400) may acquire rotation information. For example, the electronic device 400 may acquire rotation information on a rotation member (for example, the rotation member 422) acquired by an optical sensor in each designated period and may accumulate the rotation information.

In operation 1603, the electronic device 400 may determine whether the rotation information is not acquired in a current period (for example, an nth period).

In operation 1605, the electronic device 400 may generate a timer. According to various exemplary embodiments, when no rotation information is acquired in the nth period, the electronic device 400 may generate a timer. For example, the timer may indicate time to extend an operation of determining whether the rotation information is acquired in the current period in which no rotation information is acquired. Time to acquire the rotation information in the nth period may be increased by the timer operating time.

In operation 1607, the electronic device 400 may determine whether the rotation information is acquired. According to one exemplary embodiment, the electronic device 400 may determine again whether the rotation information is acquired in the nth period in which the timer operates.

When the rotation information is acquired in operation 1607, the electronic device 400 may determine that the rotation member 422 passes through an event occurring point in operation 1609. According to one exemplary embodiment, when the rotation information is acquired while the time is operating, the electronic device 400 may determine that the rotation member 422 passes through the detent. According to one exemplary embodiment, the electronic device 400 may determine that the rotation information is acquired after a delay by the detent in the nth period and may correct the accumulated rotation information to detect the detent.

When no rotation information is acquired in operation 1607, the electronic device 400 may determine that the rotation member 422 stopped in operation 1611. According to one exemplary embodiment, when no rotation information is acquired while the time is operating, the electronic device 400 may determine that the rotation member 422 stopped and may perform an operation corresponding to the accumulated rotation information.

Figure 17:
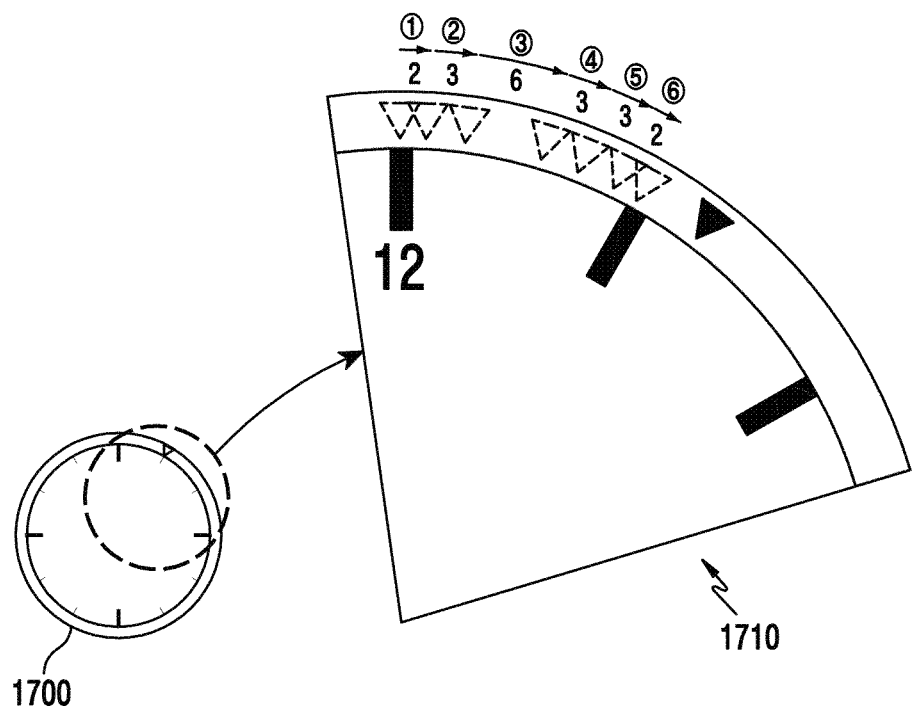
FIG. 17 is a view illustrating a situation where fast rotation of a rotation member causes a delay in acquiring rotation information according to one exemplary embodiment of the present disclosure.

FIG. 17 is a view illustrating a situation where there is a delay in acquiring rotation information according to one exemplary embodiment of the present disclosure.

For example, as illustrated in FIG. 17, assuming a situation 1700 where a rotation member (for example, the rotation member 422) of an electronic device (for example, the electronic device 400) is rotated to a first detent, the electronic device 400 may acquire two pieces of rotation information in a first period (11 ms), three pieces of rotation information in a second period (22 ms), six pieces of rotation information in a third period (33 ms), and three pieces of rotation information in a fourth period (44 ms). According to various exemplary embodiments, when no rotation information is acquired in a fifth period (55 ms), the electronic device 400 may reattempt to acquire the rotation information in the fifth period. For example, the electronic device 400 may operate a timer for a certain period of time (for example, 4 ms) in the fifth period and reattempt to acquire rotation information while the timer is operating. When rotation information is acquired in the fifth period while the timer is operating (1710), the electronic device 400 may determine that the rotation member 422 approached the detent which caused a delay acquiring the rotation information in the fifth period. Thus, the electronic device 400 may determine that the detent is detected in the fifth period and may generate an event notification.

According to various exemplary embodiments, the electronic device 400 may extend a next rotation information acquiring period by a predetermined time according to a delay in acquiring rotation information. Alternatively, the electronic device 400 may extend a rotation information acquiring period by a time required to reacquire rotation information. According to one exemplary embodiment, when it takes 4 ms to reacquire rotation information in the fifth period (for example, a period set from 45 ms to 55 ms to acquire rotation information), the electronic device 400 may extend the period by 4 ms to 59 ms to acquire rotation information. Accordingly, the next rotation information acquiring period from 56 ms to 66 ms (for example, a sixth period) may be adjusted to a period from 60 ms to 70 ms.

According to one exemplary embodiment, when the rotation member 422 senses another detent due to fast rotation thereof while the timer is operating, the electronic device 400 may delete the existing timer and operate a new timer to adjust a time to correct rotation information. The electronic device 400 may operate the new timer according to rotation of the rotation member 422, thereby delaying the time to correct the rotation information.

According to one exemplary embodiment, when no rotation information is acquired until the timer expires, the electronic device 400 may generate an event notification. When no rotation information is acquired in a state where the rotation member 422 approaches the detent, the electronic device 400 may generate an event notification as if the rotation member 422 reaches the detent.

Figure 18:
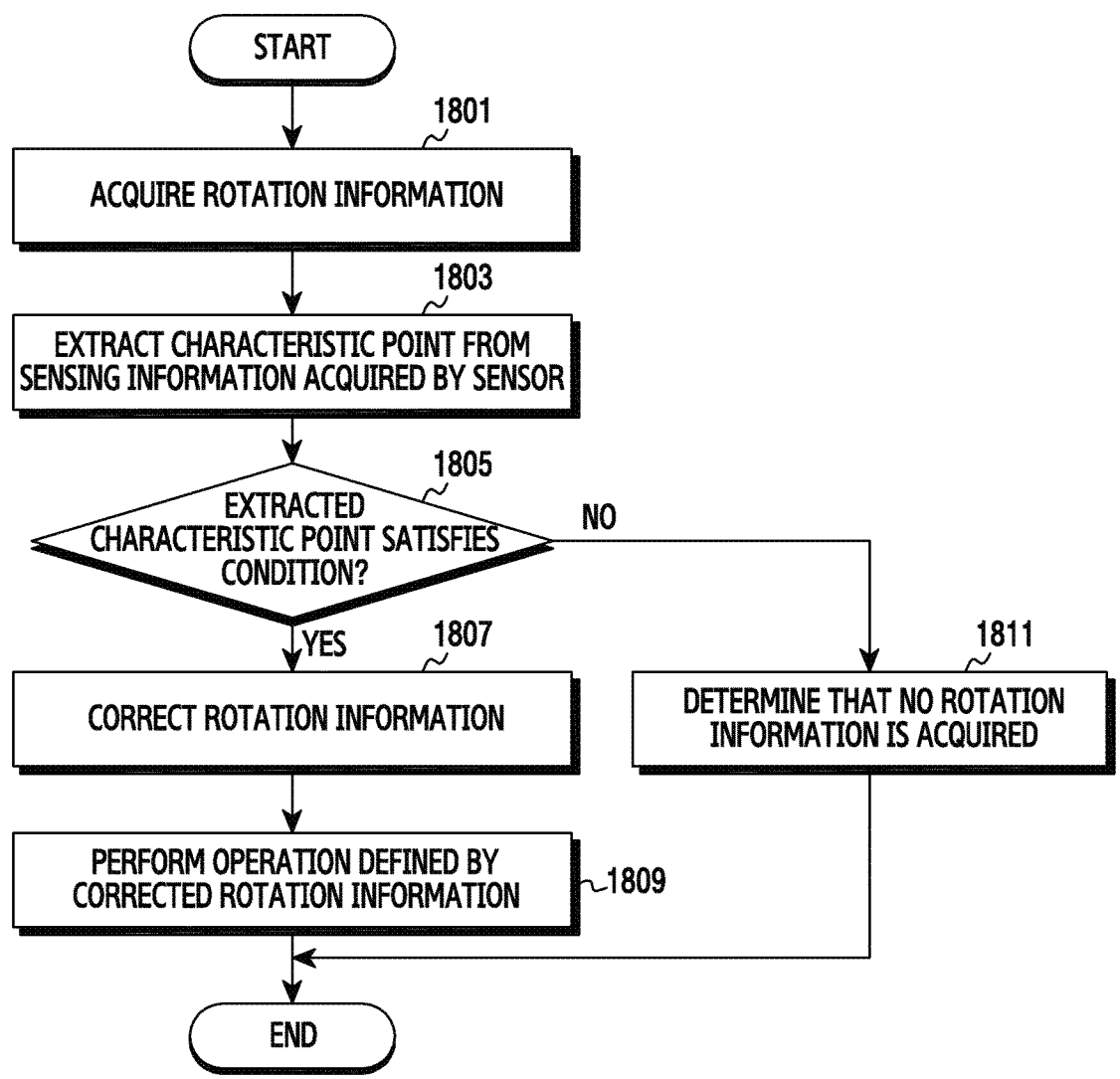
FIG. 18 is a flowchart illustrating yet another procedure for performing a method of analyzing an error in rotation information according to one exemplary embodiment of the present disclosure.

FIG. 18 is a flowchart illustrating another operation for performing a method of analyzing an error in rotation information according to one exemplary embodiment of the present disclosure. According to one exemplary embodiment, the operation of analyzing the error in the rotation information is an operation of correcting rotation information from an optical sensor based on sensing information by at least one different sensor and may be a detailed operation of FIG. 9.

In operation 1801, an electronic device (for example, the electronic device 400) may acquire rotation information.

In operation 1803, the electronic device 400 may extract a characteristic point from sensing information acquired by a sensor. According to one exemplary embodiment, the electronic device 400 may extract the characteristic point associated with a sound, vibrations, a movement, a magnetic field change, or the like corresponding to the rotation of the rotation member 422. For example, the electronic device 400 may extract the characteristic point from the acquired sensing information using a characteristic point extraction method, such as a zero-crossing method, an amplitude change detection method, and a fast Fourier transform (FFT) method.

In operation 1805, the electronic device 400 may determine whether the extracted characteristic point satisfies a condition. According to various exemplary embodiments, the electronic device 400 may determine whether the extracted characteristic point of the rotation member 422 has a similarity with a pre-stored characteristic point associated with the rotation of the rotation member 422. For example, when the electronic device 400 simultaneously acquires a first sound associated with the sense of boundary of the rotation member 422 (for example, a sound made when the rotation member 422 rotates to the detent) and a second sound not associated with the sense of boundary (for example, ambient noise), the electronic device 400 may extract only a characteristic point corresponding to the predetermined first sound and may determine whether the characteristic point satisfies the condition.

When the extracted characteristic point satisfies the condition in operation 1805, the electronic device 400 may correct the rotation information in operation 1807. According to various exemplary embodiments, the electronic device 400 may correct the rotation information corresponding to the extracted characteristic point satisfying the condition.

In operation 1809, the electronic device 400 may perform a designated operation based on the corrected rotation information.

When the extracted characteristic point does not satisfy the condition in operation 1805, the electronic device 400 may determine that no rotation information is acquired in operation 1811. According to one exemplary embodiment, the electronic device 400 may determine that no rotation information is acquired corresponding to the extracted characteristic point not satisfying the condition. For example, the electronic device 400 may not accumulate the rotation information acquired in operation 1801.

FIGS. 19A to 19D are views illustrating that rotation of a rotation member (for example, the rotation member 422) is sensed using sensor information to correct rotation information according to one exemplary embodiment of the present disclosure.

Figure 19A:
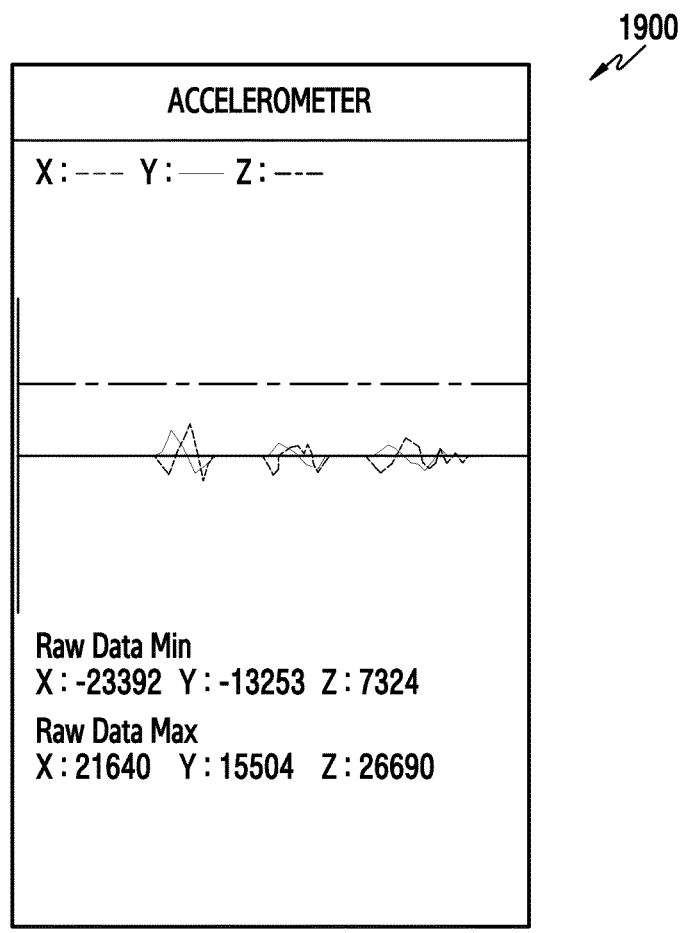
FIG. 19A, FIG. 19B, FIG. 19C and FIG. 19D are views illustrating that rotation of a rotation member is sensed using sensor information according to one exemplary embodiment of the present disclosure.

According to one exemplary embodiment, as illustrated in FIG. 19A, an electronic device (for example, the electronic device 400) may detect 1900 movement of the main body by vibrations generated when the rotation member 422 is fit to the detent. For example, the electronic device 400 may measure three-axial accelerations using an accelerometer. When acceleration associated with at least one axis corresponds to rotation of the rotation member 422, the electronic device 400 may sense that the electronic device 400 is moved by the rotation of the rotation member 422. According to one exemplary embodiment, the electronic device 400 may determine the rotation of the rotation member 422 using the movement of the electronic device 400 to correct rotation information. For example, when the rotation of the rotation member 422 is detected, although no rotation information is acquired, the electronic device 400 may perform an operation corresponding to the rotation of the rotation member 422.

Figure 19B:
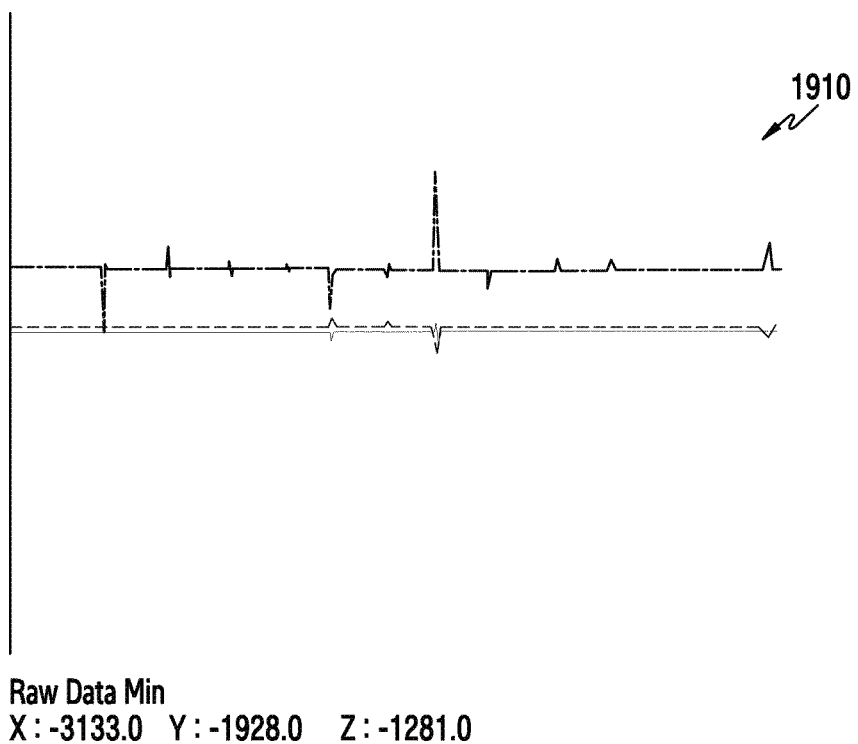

According to another exemplary embodiment, as illustrated in FIG. 19B, the electronic device 400 may detect 1910 movement of the main body. According to one exemplary embodiment, the electronic device 400 may store in advance movement of the main body associated with noise generated when the rotation member 422 is fit to the detent. For example, the electronic device 400 may measure three-axial rotation angles using a gyro sensor. When a rotation angle associated with at least one axis corresponds to rotation of the rotation member 422, the electronic device 400 may determines that the electronic device 400 is moved by the rotation of the rotation member 422 and may correct the rotation information. For example, although no rotation information is acquired as the rotation member 422 passes through the detent, the electronic device 400 may correct the rotation information to detect the detent.

Figure 19C:
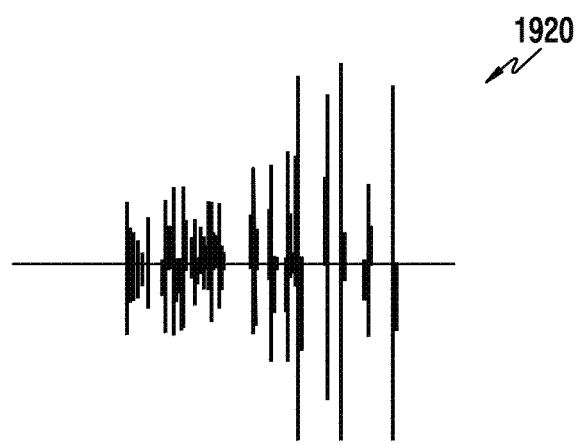

According to still another exemplary embodiment, as illustrated in FIG. 19C, the electronic device 400 may detect 1920 noise generated when the rotation member 422 is fit to the detent. For example, the electronic device 400 may sense sound waves (for example, a clicking sound) generated by the detent. When the sensed sound waves have a similarity with sound waves designated in advance, the electronic device 400 determines that the rotation member 422 is rotated and may correct the rotation information. According to one exemplary embodiment, although a time delay in rotation of the rotation member 422 occurs as the rotation member 422 passes through the detent, the electronic device 400 may correct the rotation information to detect the detent.

Figure 19D:
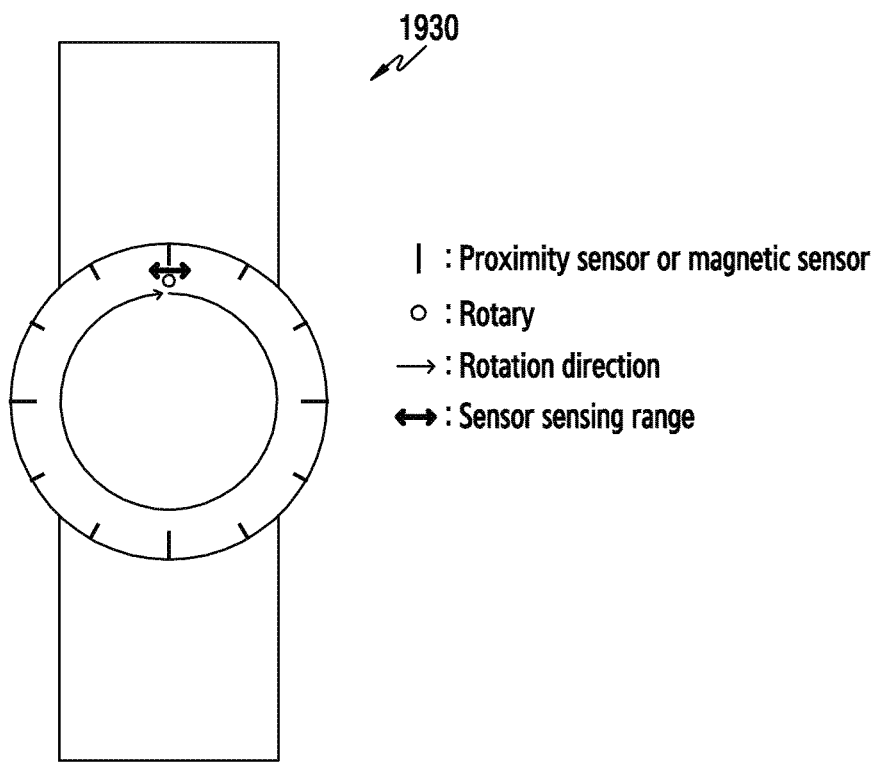

According to yet another exemplary embodiment, as illustrated in FIG. 19D, the electronic device 400 may have an auxiliary sensor (for example, a proximity sensor, a magnetic sensor, and the like) disposed corresponding to the position of the detent and may detect 1930 the rotation member 422 moving close to the detent.

According to one exemplary embodiment, although not shown, the electronic device 400 may detect a magnetic field level or a change in magnetic field by a magnet installed in the electronic device 400 when the rotation member 422 is rotated.

A rotation sensing method of an electronic device according to various exemplary embodiments may include generating a first signal by detecting a rotation of a rotation member including a portion of a main body of the electronic device; detecting the rotation of the rotation member based on at least a part of the first signal; correcting the first signal to reflect actual rotation of the rotation member when the rotation of the rotation member corresponding to the first signal is different from an actual rotation of the rotation member; and performing a predetermined action based on at least part of the corrected first signal.

According to one exemplary embodiment, when the first signal indicates that the rotation member is rotated by a selected first value or greater, the correcting the first signal may include correcting the first signal to indicate that the rotation member is rotated by a second value greater than the first value.

According to one exemplary embodiment, the correcting the first signal may include generating a second signal different from the first signal, corresponding to the rotation of the rotation member, and correcting the first signal based on at least a part of the second signal to indicate that the rotation member is rotated by the second value.

According to one exemplary embodiment, the first signal may be generated by an optical sensor.

According to one exemplary embodiment, the second signal may be generated by at least one of a geomagnetic sensor, an accelerometer, a noise sensor, and an inertial sensor.

According to one exemplary embodiment, the rotation member may include a plurality of grooves configured to cooperate with a plurality of detents or magnetic members installed at regular intervals.

According to one exemplary embodiment, a rotation sensing method of an electronic device further comprise detecting the rotation member rotating past a detent by determining whether the first signal is not acquired for a given time period or is acquired after a predetermined time period.

A computer-readable recording medium according to various exemplary embodiments may store a program to implement an operation of generating a first signal by detecting a rotation of a rotation member including a portion of a main body of the electronic device; detecting the rotation of the rotation member based on at least a part of the first signal; correcting the first signal to reflect actual rotation of the rotation member when the rotation of the rotation member corresponding to the first signal is different from an actual rotation of the rotation member; and performing a predetermined action based on at least part of the corrected first signal.

A method of sensing rotation of a rotation member and an electronic device performing the method according to one exemplary embodiment may determine the degree of rotation of the rotation member based on, for example, rotation information on the rotation member, and may detect a detent by correcting the rotation information when the rotation information is acquired after a delay.

The exemplary embodiments disclosed herein are provided for a description and understanding of technical contents and do not limit the scope of the technology disclosed herein. Therefore, the scope of the present document is constructed as including all modifications or various other exemplary embodiments based on the technical concepts of the present document. The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:

1. A wearable electronic device comprising:
   a housing including one side having a substantially circular opening;
   at least one detent disposed at the housing;
   a rotation member of the wearable electronic device, wherein the rotation member comprises a substantially circular structure configured to be rotatably positioned in or around the opening of the housing and including at least one groove being formed on a body of the structure to fit the at least one detent;
   a first sensor configured to detect a rotation of the structure to generate a first signal;
   a second sensor configured to detect that the at least one detent is inserted into the at least one groove;

a processor coupled to the first sensor and the second sensor; and a memory coupled to the processor, wherein the memory includes instructions to enable the processor, on execution, to:

receive the first signal from the first sensor, in response to receiving a second signal from the second sensor, determine, based on the second signal, whether the at least one detent is inserted into the at least one groove, in response to determining that the at least one detent is inserted into the at least one groove, correct the first signal to reflect an actual rotation of the structure, and perform a predetermined action, based on the corrected first signal.

2. The wearable electronic device of claim 1, wherein when the first signal indicates that the structure is rotated by a predetermined first value or greater, the instructions enable the processor to correct the first signal to indicate that the structure is rotated by a second value greater than the first value.

3. The wearable electronic device of claim 1, wherein the first sensor comprises an optical sensor.

4. The wearable electronic device of claim 1, wherein the second sensor comprises at least one of a geomagnetic sensor, an accelerometer, a noise sensor, and an inertial sensor.

5. The wearable electronic device of claim 1, wherein the at least one groove is configured to:

cooperate with the at least one detent;

face the opening of the housing; and be installed at regular intervals, wherein the structure generates a feedback caused at least in part by the at least one detent when the structure is rotated.

6. The wearable electronic device of claim 1, wherein the rotation of the structure is associated with at least one of rotation speed, a rotation direction, degree of rotation, and a rotation position.

7. The wearable electronic device of claim 1, wherein the second sensor operates while the structure is rotated.

8. A rotation sensing method of a wearable electronic device, the method comprising:

receiving a first signal from a first sensor, the first sensor generating the first signal by detecting a rotation of a rotation member of the wearable electronic device, wherein the rotation member comprises a substantially circular rotation structure configured to be rotatably positioned in or around an opening of the wearable electronic device and including at least one groove being formed on a body of the structure to fit at least one detent;

in response to receiving a second signal from a second sensor, determining, based on the second signal, whether the at least one detent is inserted into the at least one groove, the at least one detent being disposed at a housing, the second sensor generating the second signal by detecting that the at least one detent is inserted into the at least one groove;

in response to determining that the at least one detent is inserted into the at least one groove, correcting the first signal to reflect an actual rotation of the rotation structure; and performing a predetermined action, based on the corrected first signal.

9. The method of claim 8, wherein when the first signal indicates that the rotation structure is rotated by a predetermined first value or greater, the correcting the first signal comprises correcting the first signal to indicate that the rotation structure is rotated by a second value that is greater than the first value.

10. The method of claim 9, wherein the correcting the first signal comprises:

generating a second signal corresponding to the rotation of the rotation structure; and correcting the first signal based on at least a part of the second signal to indicate that the rotation structure is rotated by the second value.

11. The method of claim 8, wherein the first signal is generated by an optical sensor.

12. The method of claim 10, wherein the second signal is generated by at least one of a geomagnetic sensor, an accelerometer, a noise sensor, and an inertial sensor.

13. The method of claim 8, wherein the at least one groove is configured to cooperate with the at least one detent installed at regular intervals.

14. The wearable electronic device of claim 1, wherein a delay in the rotation of the structure is caused by the at least one detent being inserted into the at least one groove, wherein an error caused by the delay is removed from the first signal when the first signal is corrected, and wherein the error is determined based on the second signal, wherein the second signal is independent of the first signal.

* * * * *